(12) United States Patent
Iden

(10) Patent No.: US 8,511,236 B2
(45) Date of Patent: Aug. 20, 2013

(54) AERODYNAMIC PSEUDOCONTAINERS FOR REDUCING DRAG ASSOCIATED WITH STACKED INTERMODAL CONTAINERS

(75) Inventor: Michael E. Iden, Kildeer, IL (US)

(73) Assignee: Union Pacific Railroad Company, Omaha, NE (US)

( * ) Notice: Subject to any disclaimer, the term of this patent is extended or adjusted under 35 U.S.C. 154(b) by 237 days.

(21) Appl. No.: 12/940,649

(22) Filed: Nov. 5, 2010

(65) Prior Publication Data
US 2011/0056406 A1    Mar. 10, 2011

Related U.S. Application Data

(63) Continuation-in-part of application No. 12/394,609, filed on Feb. 27, 2009, now Pat. No. 8,215,239.

(51) Int. Cl.
*B61D 17/00* (2006.01)
*B60J 9/00* (2006.01)

(52) U.S. Cl.
USPC ........................................ 105/1.1; 296/180.4

(58) Field of Classification Search
USPC .............. 105/1.1, 1.2, 1.3; 296/180.1, 180.2, 296/180.4; 180/903
See application file for complete search history.

(56) References Cited

U.S. PATENT DOCUMENTS

| | | | |
|---|---|---|---|
| 2,101,619 A | 12/1937 | Lentz | |
| 2,108,203 A | 2/1938 | Lentz | |
| 2,148,078 A | 2/1939 | Lentz | |
| 2,253,209 A | 8/1941 | Patton | |
| 2,256,493 A | 9/1941 | Radsdale | |
| D179,222 S | 11/1956 | Schaus | |
| D220,220 S | 3/1971 | Joy | |
| 3,797,879 A | 3/1974 | Edwards | |
| 3,934,922 A | 1/1976 | MacCready, Jr. | |
| 3,980,185 A * | 9/1976 | Cain | 206/509 |
| 4,030,779 A | 6/1977 | Johnson | |
| 4,057,280 A | 11/1977 | MacCready, Jr. | |
| 4,210,354 A | 7/1980 | Canning | |
| 4,236,745 A | 12/1980 | Davis | |
| 4,326,745 A | 12/1980 | Davis | |
| 4,257,640 A | 3/1981 | Wiley | |

(Continued)

FOREIGN PATENT DOCUMENTS

JP    05-270402    10/1993

OTHER PUBLICATIONS

Photograph of EMD GP60 diesel freight locomotive, obtained from http:llwww.rrpicturearchives.net/showPicture.aspx?id=185887.

(Continued)

*Primary Examiner* — R. J. McCarry, Jr.
(74) *Attorney, Agent, or Firm* — Pillsbury Winthrop Shaw Pittman LLP

(57) ABSTRACT

Disclosed is an aerodynamic pseudocontainer for a train. The pseudocontainer is configured to be stacked atop an intermodal container so that its aerodynamic configuration reduces drag when the train is in motion, thereby reducing fuel costs and emissions. The pseudocontainer may have connectors on its bottom so that when it is placed on top of the intermodal container, locking devices may be used for attachment. Also, a top portion and a support frame of the pseudocontainer include fittings with receiving openings configured to receive parts of a positioning device (e.g., a crane) to stack and align the body atop intermodal container. The fittings may be formed in accordance with ISO standards.

19 Claims, 16 Drawing Sheets

(56) References Cited

U.S. PATENT DOCUMENTS

| | | | |
|---|---|---|---|
| 4,343,505 A | 8/1982 | Levassor | |
| 4,441,751 A | 4/1984 | Wesley | |
| 4,508,380 A | 4/1985 | Sankrithi | |
| 4,626,155 A | 12/1986 | Hlinsky et al. | |
| 4,702,509 A * | 10/1987 | Elliott, Sr | 296/180.4 |
| 4,738,203 A | 4/1988 | Gielow | |
| 4,746,160 A | 5/1988 | Wiesemeyer | |
| 4,756,256 A * | 7/1988 | Rains et al. | 105/1.1 |
| 4,909,154 A | 3/1990 | Walker | |
| 4,966,407 A | 10/1990 | Lusk | |
| 4,993,125 A | 2/1991 | Capron et al. | |
| 5,000,508 A | 3/1991 | Woods | |
| 5,222,438 A | 6/1993 | Ende | |
| 5,355,806 A | 10/1994 | Bieber | |
| 5,465,669 A | 11/1995 | Andrus | |
| 5,560,088 A | 10/1996 | Nitsche et al. | |
| 5,562,374 A | 10/1996 | Plamper | |
| 5,570,981 A | 11/1996 | Brewster | |
| 5,577,449 A | 11/1996 | Kleiner | |
| 5,676,271 A | 10/1997 | Reynard | |
| 6,286,894 B1 | 9/2001 | Kingham | |
| 6,519,816 B1 | 2/2003 | Tagaguchi et al. | |
| 6,585,312 B2 | 7/2003 | Jain | |
| 6,692,203 B2 | 2/2004 | Kim et al. | |
| 6,877,793 B2 | 4/2005 | Cory | |
| 6,959,958 B2 | 11/2005 | Basford | |
| 7,008,005 B1 | 3/2006 | Graham | |
| 7,017,508 B2 | 3/2006 | Vanmoor | |
| 7,114,898 B2 | 10/2006 | Brewster | |
| 7,178,846 B2 | 2/2007 | Niskanen | |
| 7,207,620 B2 | 4/2007 | Cosgrove | |
| 7,380,868 B2 | 6/2008 | Breidenbach | |
| 7,484,918 B2 | 2/2009 | Brewster | |
| 7,510,358 B2 | 3/2009 | Brewster | |
| 7,784,409 B2 | 8/2010 | Iden et al. | |
| 8,215,239 B2 | 7/2012 | Iden | |
| 2003/0070577 A1 | 4/2003 | Smith et al. | |
| 2004/0239146 A1 | 12/2004 | Ortega et al. | |
| 2005/0139115 A1 | 6/2005 | Harada et al. | |
| 2005/0242601 A1 | 11/2005 | Niskanen | |
| 2005/0258330 A1 | 11/2005 | Brewster | |
| 2005/0279241 A1 | 12/2005 | Roop et al. | |
| 2007/0212182 A1 | 9/2007 | Brewster | |
| 2007/0212183 A1 | 9/2007 | Brewster | |
| 2008/0256767 A1 | 10/2008 | Berns et al. | |
| 2008/0309122 A1 | 12/2008 | Smith et al. | |
| 2009/0047090 A1 | 2/2009 | Brewster | |
| 2009/0123250 A1 | 5/2009 | Brewster | |
| 2009/0179456 A1 | 7/2009 | Holubar | |
| 2010/0102574 A1 | 4/2010 | Brewster et al. | |

OTHER PUBLICATIONS

International Standard ISO 1161:1984, Series 1 freight Containers—Corner fittings—Specification.

International Standard ISO 1161:1984, Series 1 freight Containers—Corner fittings—Specification; Technical Corrigendum 1.

Canadian Office Action by Examiner Jeremy Garnet dated Jul. 6, 2012.

* cited by examiner

AERODYNAMIC PSEUDOCONTAINERS FOR REDUCING DRAG ASSOCIATED WITH STACKED INTERMODAL CONTAINERS

CROSS REFERENCE TO RELATED APPLICATION(S)

This application is a continuation-in-part of non-provisional U.S. application Ser. No. 12/394,609, filed Feb. 27, 2009, the contents of which are incorporated herein by reference in its entirety.

BACKGROUND

1. Field of Invention

The present invention is generally related to reducing aerodynamic drag on stacked intermodal containers.

2. Description of Related Art

Generally the use of stacked (or "double stacked") intermodal containers, wherein a top container is mounted on a bottom container, is known as a method of transporting goods on rail. For example, as shown in FIG. 1 and further described in detail below, a series 104 of stacked intermodal containers may be provided on container cars 113 and pulled by a locomotive 102 along a track 103 to form a train used for transporting goods on land. Though transporting intermodal containers in a double stack assists in lowering rail haul costs, it would be beneficial to further reduce such costs associated with rail transportation. For example, the expenses associated with operating a fuel (e.g., diesel) powered locomotive may significantly increase based on rising fuel prices. Additionally, exhaust emissions of diesel fuel may cause damage and be harmful to the environment.

In some instances, such as shown in U.S. Pat. Nos. 4,702,509 and 5,000,508, it has been known to attach inflatable devices to vehicles to assist in reducing aerodynamic drag. However, these known devices tend to achieve low reductions in aerodynamic drag, and fail to provide a device that is versatile and may be used with different sized containers in a train.

SUMMARY

One aspect of the invention provides an aerodynamic pseudocontainer for reducing aerodynamic drag associated with a train. The pseudocontainer has a body configured to be stacked atop an intermodal container that has corner fittings with connection openings. The body has a bottom portion, a top portion, side portions, a front portion, and a back portion. A plurality of fittings, each which have receiving openings, are associated with the top portion of the body. The bottom portion is configured to be aligned with a top of the intermodal container. A plurality of locking devices is provided to connect the body to the intermodal container, which are configured to be secured within the connection openings of the intermodal container. The body of the pseudocontainer comprises an aerodynamic configuration for reducing drag when the train is in motion. Also, the receiving openings of the fittings associated with the top portion of the body are configured to receive parts of a positioning device for aligning and stacking the body atop the intermodal container.

In one aspect, the aerodynamic pseudocontainer also includes a support frame at a front portion that is positioned to support at least two fittings comprising receiving openings at a substantially similar height as the plurality of fittings associated with the top portion of the body. The support frame may have a pair of vertical frame members and a transverse cross piece. The vertical frame members are spaced laterally from the front portion of the body, each on an opposite side of the front portion. A first end of each vertical frame member is connected to the bottom portion of the pseudocontainer and a second end of each vertical frame member is connected to the transverse cross piece.

Another aspect of the invention includes a method of reducing aerodynamic drag of a series of containers. The series has at least a first set of containers having an aerodynamic pseudocontainer stacked above an intermodal container that has corner fittings with connection openings. The pseudocontainer has a bottom portion with a plurality of bottom fittings having lock-receiving openings, a top portion with fittings having receiving openings, and a vertically extending support frame at a front portion with fittings having receiving openings. The intermodal container has corner fittings with a plurality of connection openings each configured to receive a part of a locking device. The body of the pseudocontainer has an aerodynamic configuration for reducing drag when the series is in motion. The method includes:

locking parts of a positioning device within the fittings associated with the top portion and the vertically extending support frame;

providing the aerodynamic pseudocontainer atop the intermodal container using the positioning device;

aligning the bottom fittings of the bottom portion of the pseudocontainer with the corner fittings of the intermodal container;

removably mounting the pseudocontainer to the intermodal container using locking devices, each locking device configured to be secured in the connection openings of the intermodal container and in the lock-receiving openings of the pseudocontainer, and unlocking the parts of the positioning device from within the fittings associated with the top portion and the vertically extending support frame Other objects, features, and advantages of the present invention will become apparent from the following detailed description, the accompanying drawings, and the appended claims.

BRIEF DESCRIPTION OF THE DRAWINGS

FIG. 3b illustrates a detailed view of a connection of the aerodynamic pseudocontainer and container of FIG. 2 using the corner locking device of FIG. 3a;

FIG. 8b illustrates a detailed view of a connection of the aerodynamic pseudocontainer and container of FIG. 7 using the locking device of FIG. 8a;

DETAILED DESCRIPTION OF THE PREFERRED EMBODIMENT(S)

It is a goal of the present invention to reduce the amount of aerodynamic drag and vortices created among a series of stacked intermodal containers during transportation. Though intermodal containers are designed to be used in more than one form of transportation, e.g., railway, waterway, or highway, the embodiments below are herein described pertaining to their use on a railway.

Figure 1:
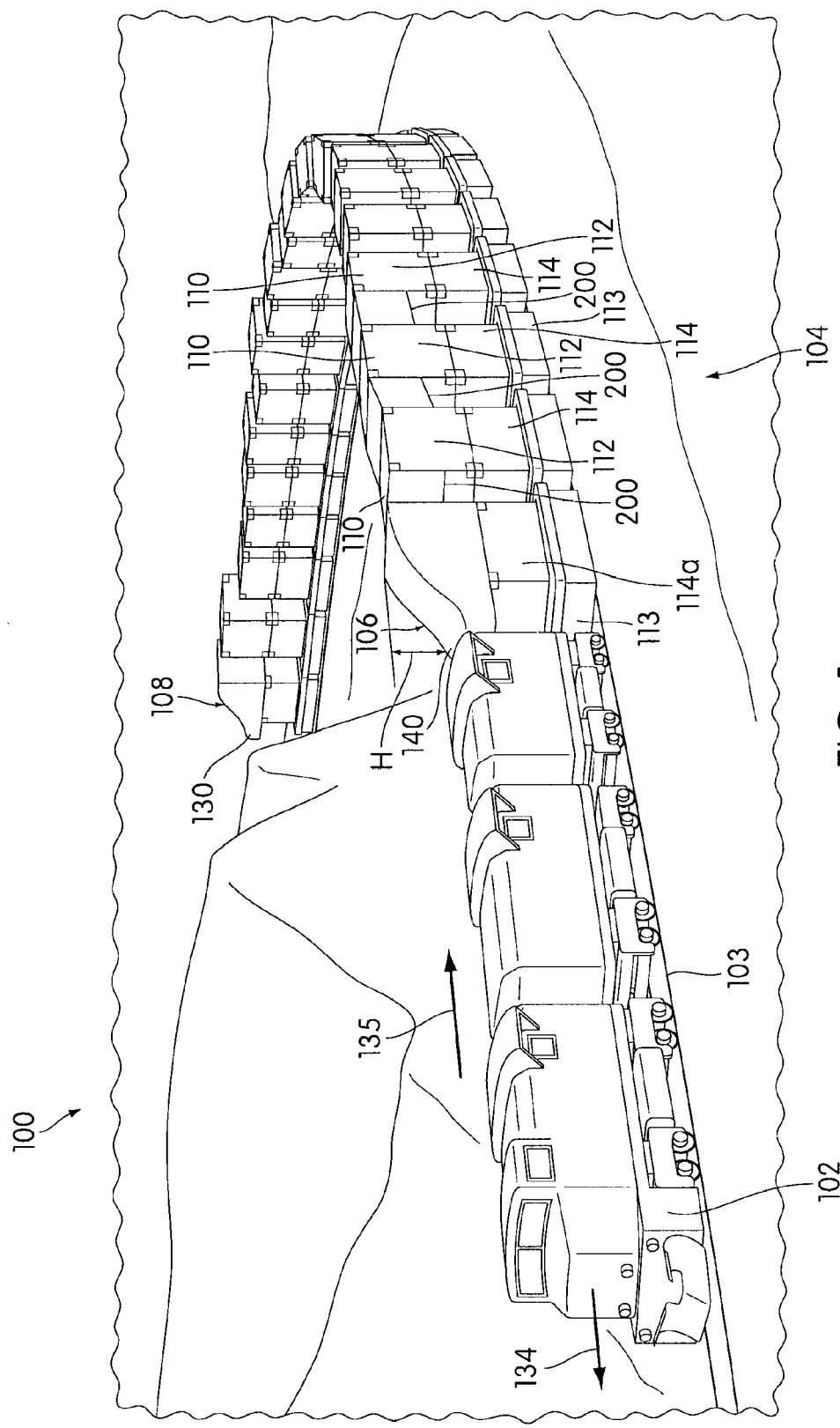
FIG. 1 illustrates a train comprising a locomotive pulling a series of stacked intermodal containers including an aerodynamic pseudocontainer in accordance with an embodiment of the present invention.

Referring now more particularly to the drawings, FIG. 1 illustrates a train 100 comprising a locomotive 102 pulling a series 104 of intermodal containers. The locomotive 102 is located at a lead end of the train 100. The locomotive 102 may be a vehicle that is diesel-powered via a power source to pull the series 104 of intermodal containers mounted on container cars 113 on railroad tracks or rails 103, as is known in the art. As shown, the series 104 has at least a plurality of stack or container cars 113 coupled rearward of the locomotive 102.

The container car 113, also known as a double stack car or a well car, is a railroad car that is designed to carry intermodal containers. One or more of the container cars 113 may comprise a set of intermodal containers 112, 114 stacked one atop the other therein. In some cases, a plurality of sets 110 of stacked intermodal containers may be provided in the train 100. The container cars 113 are connected in series and are moved (pulled or pushed) by one or more locomotives 102. The container cars 113 comprise a well and track engaging wheels for moving along the track 103. Container cars 113 may be connected in the train 100 via coupling mechanisms, as generally known.

Each set of intermodal containers may comprise a top container 112 stacked or mounted on a bottom container 114, also referred to herein as a double stack. The mounting and/or locking of top and bottom containers 112 and 114, respectively, to each other in a stack is generally known in the art, as is discussed further below. It is noted that a container, as herein described, is defined as a box container, bulk container, tank, or other storage device comprising a structure or frame that allows for stacking and mounting on top of one another. Generally such containers are also referred to as "ISO containers," as they are manufactured according to specifications from the International Standards Organization (ISO) and are suitable for multiple transportation methods such as truck and rail, or rail and ship. For example, a known standard for such containers is ISO 1496. In an embodiment, each of the containers 112 and/or 114 comprises a top wall 116, a bottom wall 118, front wall 120, back wall 122, and side walls 124 to form an enclosed box, for example. In some cases, the walls 116-124 may be connected by a frame (not shown). The containers as described herein may comprise various sizes and features. As generally known in the art, the side walls may comprise doors or openings allowing access to contents being held therein. The doors may be provided on a back wall, near the rear of the container, near the front of the container, on the sides of the container, or even access via the top of the container. Alternatively, a top wall may not be included. The dimensions or sizes of the containers should also not be limiting. For example, standard ISO shipping containers comprising dimensions of 40 to 53 feet long, 8 feet to 9 feet 6 inches high, and 8 feet wide may be used for transportation. Additionally, the type of product held by the containers should not be limiting. For example, though a box container is generally described herein, the device may be used with bulk containers typically 20 to 28 feet long and/or tanks designed to hold liquids with a holding capacity of 4000-6000 gallons.

Also, each of the containers may also facilitate stacking. Each intermodal container also comprises fittings 125 at each corner, sometimes referred to as "corner fittings" in the art, comprising a plurality of connection openings 125a or apertures, such as shown in detail in FIGS. 3a-3b and 8a-8b, also formed according to ISO standards. In an embodiment, the corner fittings are formed in accordance with ISO 1161 1984 and any of its technical corrigendums. The "corner fittings" 125 are defined as fittings provided at a corner where the top wall 116/bottom wall 118 and side walls 124 meet. They may also be at a corner where the top wall 116/bottom wall 118, sides 124 and end walls 120/122 meet; however, that is not necessary. For example, in a standard 40 foot ISO container, the corner fittings 125 are provided adjacent or at the corners defined by a meeting of the top 116/bottom 118, side 124, and end walls 120/122 (e.g., in accordance with ISO specifications). In a larger container, however, such as a 48 foot or 53 foot ISO container, corner fittings 125 may be provided at the corners defined at the meeting of the top 116/bottom 118 and side walls 124 (i.e., adjacent or at a junction of three walls), but also a second set may be provided and spaced inwardly from the end walls 120/122 (i.e., at a junction of two walls, such as a top wall and a side wall). More specifically, a second set of corner fittings may be provided at a position that would align with corner fittings of a 40 foot ISO container. Generally, at least eight (8) corner fittings 125 are provided on a container (two top right, two top left, two bottom right, two bottom left). In some embodiments, sixteen (16) corner fittings 125 may be provided on the container. In an embodiment, the corner fittings are only provided at a second, inwardly spaced position. For example, in an embodiment, a container 114 or 114a comprises corner fittings 125 only at the second, inwardly spaced position at junctions of two walls. FIGS. 13a and 13b illustrate examples of these types of containers, and are further described below. Generally it is known in the art that such corner fittings 125 are provided on the containers at specific/similar locations, no matter their ISO dimensions, so as to allow for their ease of stacking and intermodal transport. Also, the corner fittings 125 may be made from a number of materials including, but not limited to, aluminum, stainless steel, and carbon steel.

The connection openings 125a of the fittings 125 are commonly used to connect or releasably lock the top container 112 to the bottom container 114 when mounted on each other to form a stack/double stack, for example. The connection openings 125a may also be used to lift and/or align a container, for example. The connection openings 125a of the corner fittings 125 comprise an opening, hole, or aperture for receiving a securing, clamping, or connecting device. The opening, hole, or aperture 125a may be circular, oval, or any other shape, although they are typically elongated in shape. Again, in an embodiment, the corner fittings 125 are also designed to meet ISO standards and/or specifications; the dimensions related to openings 125a are also therein defined.

Figure 3A:
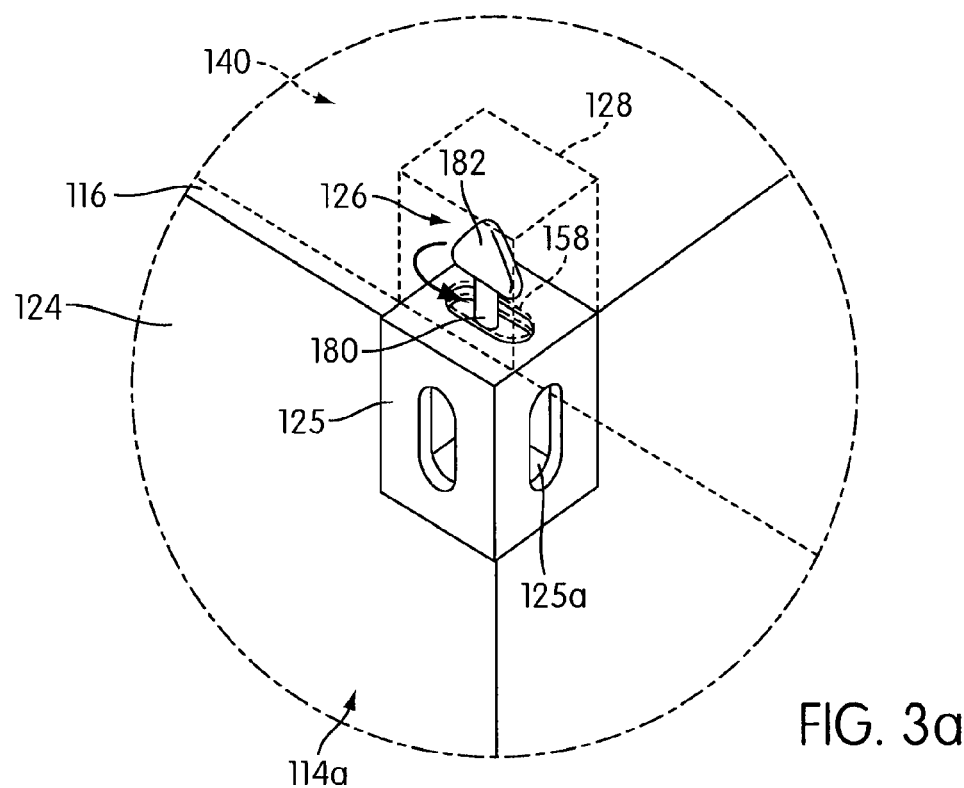
FIG. 3a illustrates a detailed view of a corner locking device for securing the aerodynamic pseudocontainer of FIG. 2 to a container in accordance with an embodiment of the present invention.
Figure 8A:
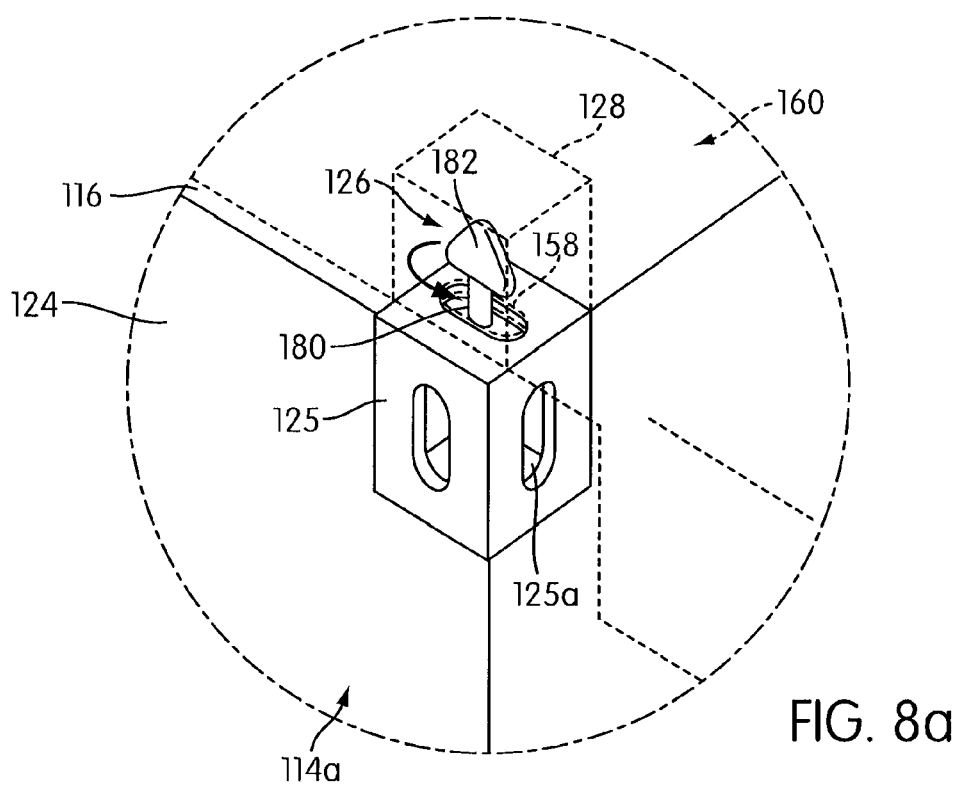
FIG. 8a illustrates a detailed view of a locking device for securing the aerodynamic pseudocontainer of FIG. 7 to a container in accordance with an embodiment of the present invention.

In order to lock two intermodal containers together (or lock a container to a railcar such as container car 113, or lock a lift to a container), it is commonly known to use locking devices or coupling devices which may be known as interbox connectors (IBCs) or twist locks, such as represented by element 126 in FIGS. 3a and 8a. Devices such as IBCs and twist locks are safety locking mechanisms and may be manually or automatically actuated. These locking devices are designed to be inserted into the elongated connection openings 125a of corner fittings 125 of a top and bottom container 112 and 114, for example, and in some cases are twisted or rotated to lock a head portion within the connection opening 125a. Specifically, the locking device has a shaft with an elongated head that aligns with and is inserted into an opening 125a (further described below). The head is then pivoted out of alignment with opening 125a to prevent its withdrawal and provide the locking action. The locking devices may have another head or alignment device on its opposite end, so as to lock the body with respect to the hole of the corner fitting 125. Other container connector clamps, coupling devices, or locking devices that are known in the art may also be used alone or in combination with other locking devices (e.g., tie downs). Such devices may manually or automatically latch or lock in the corner fittings 125. The locking devices may be made of any number of materials, such as steel or galvanized steel, and are not designed to be limiting. As will be described with respect to FIGS. 3a-3b and 8a-8b, in accordance with an embodiment, a plurality of locking devices 126 such as IBCs or twist locks may be used to lock an aerodynamic pseudocontainer 140 or 160 to the corner fittings 125 of a bottom container 114a.

When the series 104 of stacked intermodal containers are received on container cars 113 attached to a locomotive 102, for example, as shown in FIG. 1, the series 104 of double stacked intermodal containers of the train 100 generally protrude a distance or a height H above the locomotive 102. For example, the height H may be five to six feet above the highest point or height of the locomotive 102. Such a height difference provides a significant source of aerodynamic drag while pulling the series 104 of containers in a forward direction (as indicated by arrow 134). As the containers are pulled in a forward direction 134, the air flow (as indicated by arrow 135) creates drag in an opposite direction. Some wind tunnel studies have shown, for example, that the first twenty percent (20%) of a train 100 produces the most drag. Thus, a transition between locomotive 102 and containers in lead container car 106 that assists in reducing the overall aerodynamic drag of the train 100 would be beneficial. Additionally, air forces or vortices may be formed around the edges of containers when moving in a forward 134 direction at high speeds. Attaching additional aerodynamic drag reducing devices to reduce the drag and vortices of the stacked intermodal containers of the train 100 while moving thus provides a plurality of benefits.

Therefore, the plurality of container cars 113 include a lead container car 106 positioned proximate the locomotive 102. The lead container car 106 comprises a single intermodal container 114a and an aerodynamic pseudocontainer 140 stacked atop the intermodal container. The term "aerodynamic pseudocontainer" herein refers to a device that is a non-freight carrying structure that mounts in place of an actual container, and that has an aerodynamic configuration or shape to reduce aerodynamic drag of a train 100. That is, it is not a container that actually carries any freight, but it mounted in place like a container—hence the term pseudocontainer. It is, in basic terms, an aerodynamic structure that is mounted as a container replacement. In an embodiment, at least one aerodynamic pseudocontainer 140 may be provided as part of the lead container car 106 to assist in reducing the amount of drag associated with the stacked intermodal containers of a moving train 100.

Figure 2:
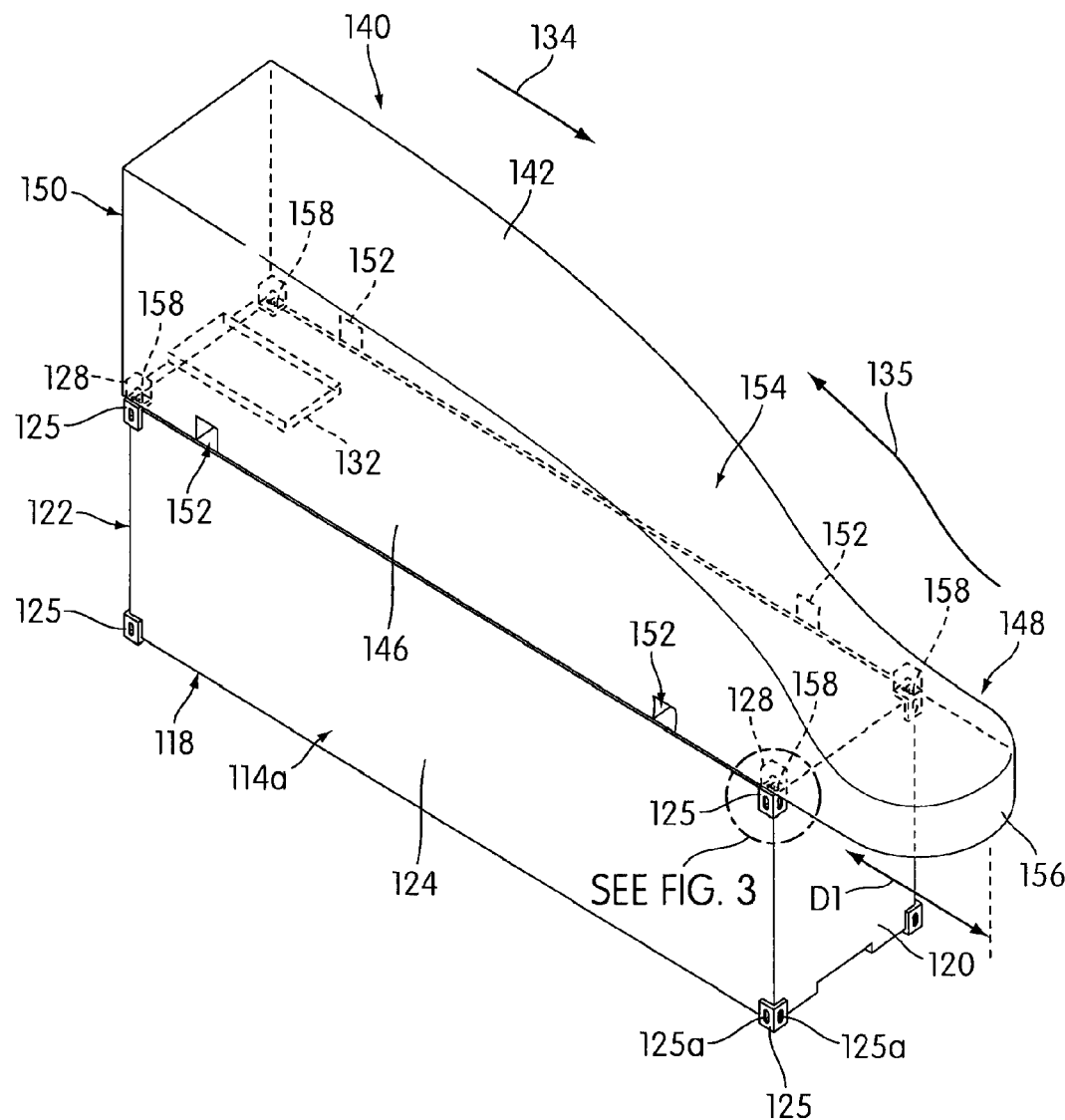
FIG. 2 illustrates a perspective view of a container having an aerodynamic pseudocontainer attached thereto in accordance with an embodiment of the present invention.

The aerodynamic pseudocontainer 140 comprises a body having an aerodynamic configuration and attachments or connectors 128. In the embodiment of FIG. 2, the pseudocontainer 140 is configured to be mounted on and attached to the top wall 116 of a leading bottom intermodal container 114a. That is, the pseudocontainer 140 and intermodal container 114a are configured to be placed in a container car 113 positioned adjacent the locomotive 102 at a lead end of the train 100, such that, as the train 100 moves in a forward direction 134, air coming up and over the locomotive 102 may be directed over at least a top portion 142 of the pseudocontainer 140 in the series 104, as represented by arrow 135, thus reducing the resistance or drag.

As shown in the embodiment of FIGS. 2-5, the aerodynamic pseudocontainer 140 comprises a top portion 142, a bottom portion 144, side portions 146, a front portion 148, and back portion 150 which are connected together to form the body, for example. In some cases, two or more of the portions 142-150 may be connected by a frame or reinforcement device (not shown). Also, though only a first (e.g., left) side portion 146 is shown in detail in the Figures, it is to be understood that the second (e.g., right) side portion 146 comprises similar features as described herein.

Figure 4:
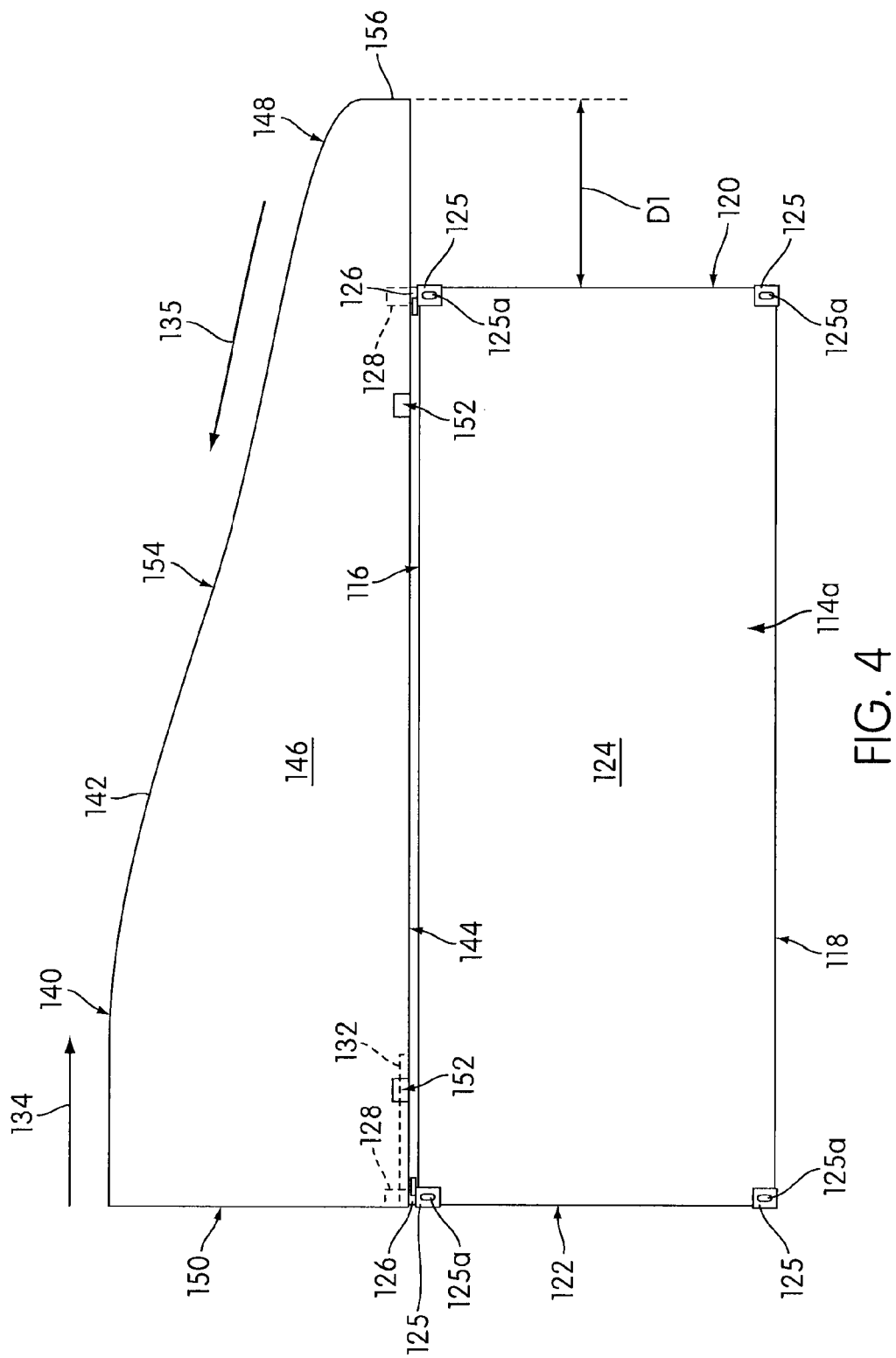
FIG. 4 illustrates a side view of the container and aerodynamic pseudocontainer of FIG. 2 in accordance with an embodiment of the present invention.
Figure 5:
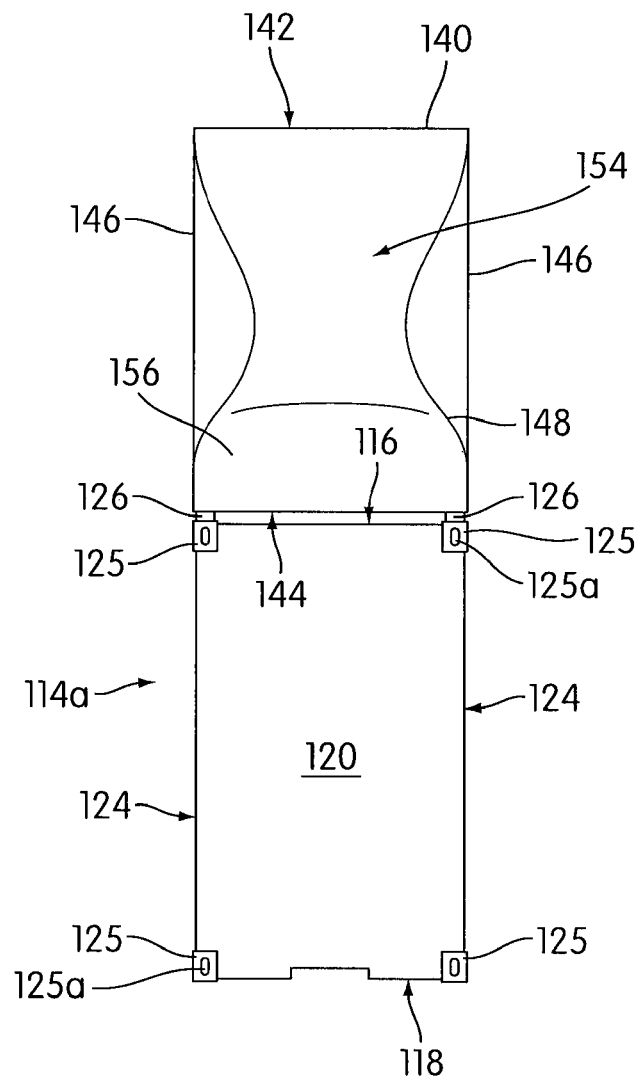
FIG. 5 illustrates a front view of the container and aerodynamic pseudocontainer of FIG. 2 in accordance with an embodiment of the present invention.

The back portion 150 is a substantially vertical portion that may be of a generally similar size (e.g., height and width) and shape to that of an intermodal container. Back portion 150 may comprise a substantially rectangular shape (e.g., rectangle or square). The front portion 148 comprises a substantially radiussed or rounded nose edge 156 formed from the top portion 142 and side portions 146. The front portion 148 and nose edge 156 comprise substantially rounded surfaces and limited corners so as to provide an aerodynamic shape. More specifically, the top portion 142 has a surface 154 that curves upwardly and longitudinally (along the length of the body) from the substantially rounded nose edge 156 of the front portion 148 to the back portion 150. As shown in FIG. 4, the surface 154 of the top portion 142 generally comprises an upwardly curved slope. Similarly, the side portions 146 comprise at least an upper edge that curves with the surface 154 of the top portion 142 from the substantially rounded nose edge 156. In some cases, such as illustrated in FIG. 5, the side portions 146 may curve concavely inwardly such that a portion adjacent the front portion 158 has a width that is narrower than a width of the bottom portion 144.

The bottom portion 144 of the pseudocontainer 140 is configured to be stacked atop the container 114*a*. The bottom portion 144 may comprise a substantially rectangular configuration. The bottom portion 144 may comprise, at least in part, some dimensions that are substantially similar to the dimensions of the container 114*a*. The base or footprint of the bottom portion 144 may be such that it may be aligned with a standard ISO container that is 40 feet in length, for example.

Figure 6:
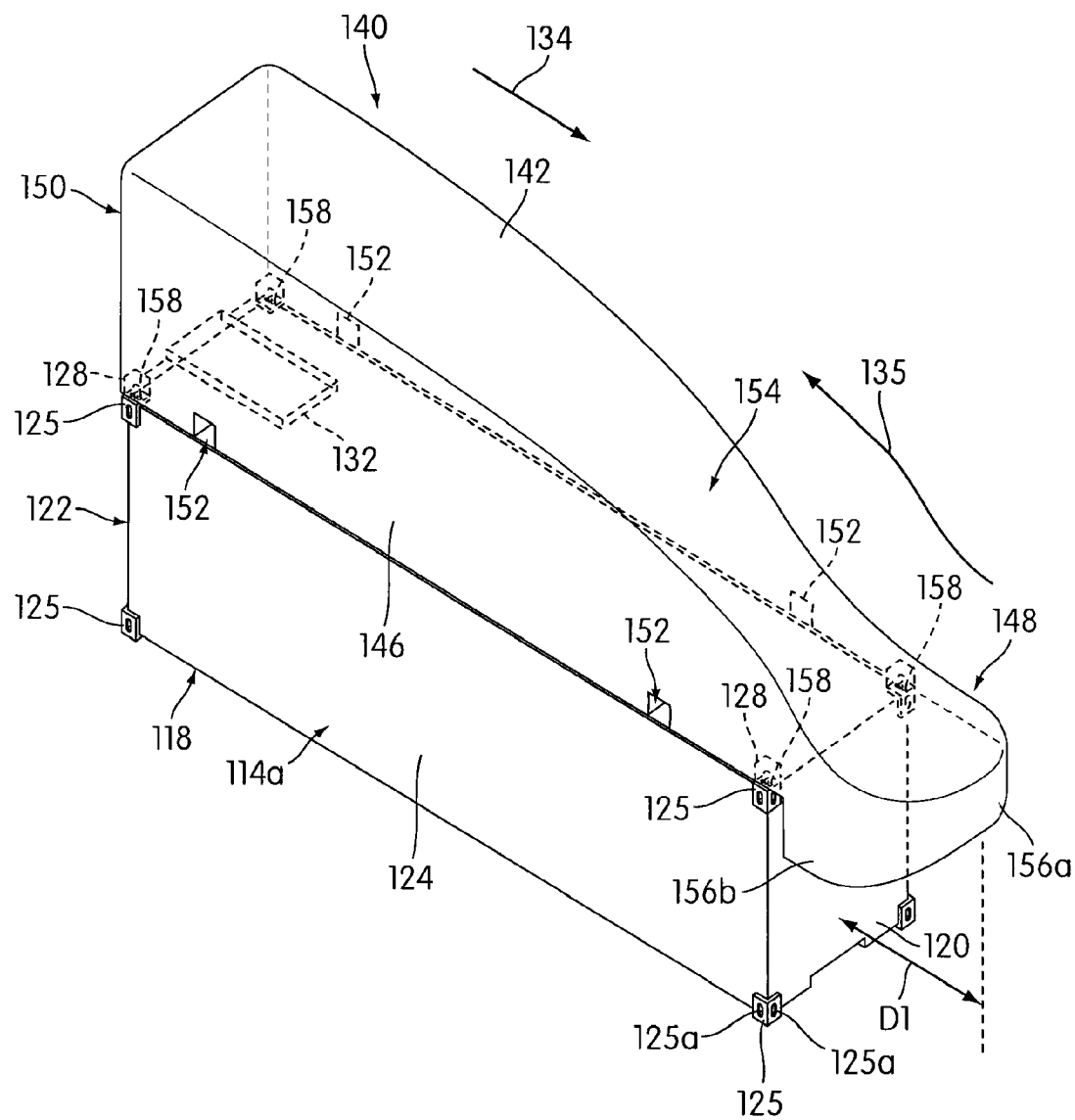
FIG. 6 illustrates a perspective view of a container having an aerodynamic pseudocontainer attached thereto such as shown in FIG. 2 with an elongated front face in accordance with an embodiment of the present invention.

The type of body used with the aerodynamic pseudocontainer 140 may include any number of shapes, sizes, and/or materials and should not be limiting. For example, in some embodiments, the body comprises at least one radiussed edge near or at its front portion 148. In some embodiments, the pseudocontainer 140 may comprise rounded edges and a downwardly extending front face such as shown in FIG. 6. For example, the pseudocontainer 140 of FIG. 6 comprises similar portions 142-150 and details (e.g., connectors 128) as described above with respect to FIGS. 2-5 and includes an alternative configuration. As shown, the edges of the pseudocontainer may be rounded or softened where each of the portions 142-150 or faces meet. The rounding of such edges may further aid in reducing drag during movement, for example. The front portion 148 may also or alternatively include a rounded nose edge 156*a* and a downwardly extending underhang portion 156*b*. The underhang portion 156*b* comprises an edge curving downwardly from the rounded nose edge 156*a* and positioned at least partially adjacent to and/or in front of the wall 120 of the container 114*a*. The curved surface of the underhang portion 156*b* may further assist in directing air away from the wall 120 and around the container 114*a* to reduce drag. Another example of such an embodiment is described with respect to FIGS. 7-10D, for example.

Additionally, the materials and manufacturing processes used to form the aerodynamic pseudocontainer 140 should not be limited. For example, the pseudocontainer may be formed from materials such as fiberglass, plastic film, and/or molded plastic or foam. The pseudocontainer may also be formed from multiple materials. In some embodiments, the portions of the pseudocontainer may be formed or manufactured separately and then connected together using suitable securement means or devices. In some cases, each of the portions 142-150 need not be made from the same materials. It should also be noted that it is within the scope of the invention to use a frame or reinforcement devices or securement devices for assembly of the pseudocontainer 140, and thus its assembly should not be limiting.

In an embodiment, the aerodynamic pseudocontainer 140 is designed to utilize the existing corner fittings 125 of the bottom container 114*a* for attachment. More specifically, the connection openings 125*a* of the corner fittings 125 of the leading bottom container 114*a* are unrestricted and provide an accessible opening for utilizing a corner locking device (such as a twisting lock 126). Utilizing the corner fittings 125 for attachment or mounting of the aerodynamic pseudocontainer 140 is beneficial as the fittings 125 are existing devices on ISO intermodal containers and no modification needs to be made to the container 114 (or its frame, if provided). In order to secure the aerodynamic pseudocontainer 140 and use the corner fittings 125 and connection openings 125*a* as locations for mounting, the aerodynamic pseudocontainer 140 comprises connectors 128.

The connectors 128 are designed to allow attachment or mounting of the body of pseudocontainer 140 to a bottom container such as 114*a*. The connectors 128 may comprise a design or configuration similar to corner fittings 125 of intermodal containers, for example. In particular, the connectors 128 may comprise one or more elongated lock-receiving openings 158 for receiving a securing, clamping, mounting, or locking device, such as locking device 126 (described further below). The lock-receiving opening(s) 158 may be a hole or aperture of circular, oval, or any other shape. In an embodiment, the opening(s) 158 are of elongated shape. The elongated opening(s) 158 may be provided on a bottom portion 144 (e.g., see FIG. 3*b*) or a side portion 146, for example. However, the location and designs of the opening(s) 158 and connectors 128 should not be limited. In an embodiment, connectors 128 may be manufactured using known methods such as casting. In an embodiment, connectors 128 may be made of materials such as steel or other metals. In an embodiment, connectors 128 may be molded or formed as a part of the aerodynamic pseudocontainer body. The materials and manufacturing methods used for the connectors 128 should not be limiting.

In the illustrated embodiment of FIGS. 2-5, the connectors 128 are provided in the bottom portion 144 of the aerodynamic pseudocontainer 140 at a location that allows for mounting with the corner fittings 125 of the container 114*a*. For example, the connectors 128 may be placed along or within the bottom portion 144 such that the connectors 128 are configured to align with the corner fittings 125, as shown in FIG. 3*b*. That is, the connectors 128 may be provided at a location that corresponds with the dimensions or specifications in accordance with ISO standards. In some embodiments, the connectors 128 may be placed along the bottom 144, sides 146, or a combination thereof. As such, the location of the connectors 128 should not be limiting, so as along as such sections 128 allow for the placement, mounting, and locking of the aerodynamic pseudocontainer 140 with respect to the leading, bottom container 114*a*.

In order to move the aerodynamic pseudocontainer 140 through a train yard and/or mount the pseudocontainer 140 on top of a container 114*a*, a plurality of lift points 152 may be provided in the body. For example, lift points 152 may be provided on the side portions 146 of the body. The lift points 152 may also be provided near or in a top portion 142 or near or in a bottom portion 144 of the pseudocontainer 140. In an embodiment, the lift points 152 comprise an opening extending into the body of the pseudocontainer 140. The openings of the lift points 152 may comprise any configuration, including a design similar to connection openings 125*a* of corner fittings 125 of an intermodal container, for example. The openings enable the aerodynamic pseudocontainer 140 to be lifted into position by the same lift equipment that may be used for lifting intermodal containers 112 or 114. For example, the lift points 152 enable the pseudocontainer to be handled (e.g., lifted, moved, etc.) using lift arms which are found on most existing container lifting spreaders or equipment (which are generally known in the art). In some cases, spreaders or such equipment may even include swinging lift arms which may be moved and stored with respect to the spreader so that container operations and movements may be performed. Thus, the lift points 152 are advantageous in that they allow for the use of existing equipment for movement and mounting on a container. The location and design of the lift points 152 should not be limited.

Figure 7:
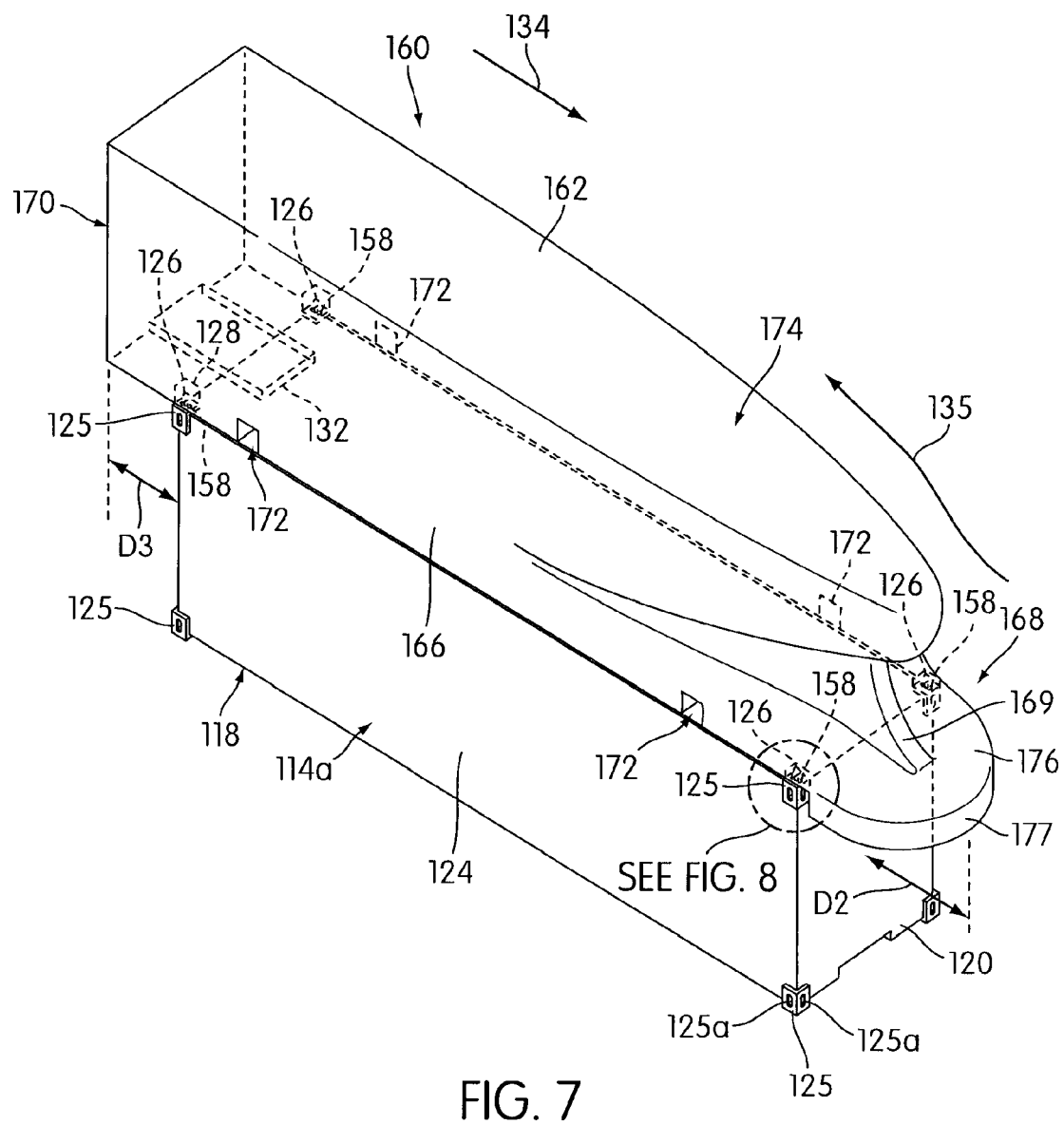
FIG. 7 illustrates a perspective view of a container having an aerodynamic pseudocontainer of alternate shape attached thereto in accordance with an embodiment of the present invention.

Also, it should be noted that when transporting the pseudocontainer 140 around the yard, for example, it may be mounted or assembled in any manner using known equipment. For example, because of the unique shape and dimensions of the pseudocontainer 140, in order to transport it on land (e.g., rather than lifting via lift points 152), a gooseneck tunnel 132 may be provided on the bottom portion 144 of the pseudocontainer. The gooseneck tunnel 132 of the pseudocontainer may be formed such that it comprises a similar configuration and/or measurements as known in the art according to ISO standards for gooseneck tunnels on containers, for example. The gooseneck tunnel 132 may be provided in relation to the back portion 150 (i.e., opposite the aerodynamically-shaped or streamlined end or front portion 148) to facilitate placement on a standard container or truck chassis trailer, and the front portion 148 may be positioned at an opposite end of the chassis, such that as it is moved about the yard, it is transported backwards (i.e., front end 148 faces and is positioning toward the rear). The placement of the gooseneck tunnel 132 and positioning on the chassis trailer is particularly useful if a protrusion or extension (such as underhang portion 156b or extension portion 177 as shown in FIGS. 6 and 7, respectively) is provided on the pseudocontainer. The location of the gooseneck tunnel should not be limiting. The pseudocontainer may be transported, moved, or mounted within the yard using known equipment, as further described below.

Figure 3B:
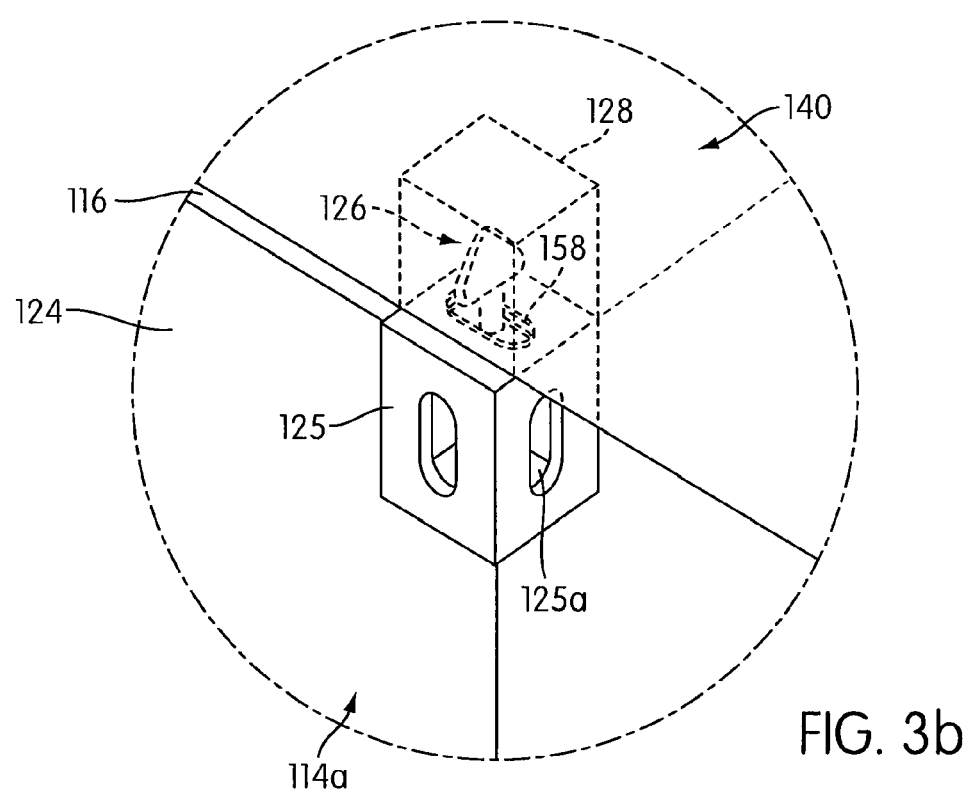

As previously noted, the aerodynamic pseudocontainer 140 may be secured to bottom container 114a using a plurality of locking devices 126. As shown in detail in FIG. 3a, each locking device 126 is such that it may be inserted and locked into a corner fitting 125 of the container 114a and correspondingly inserted and locked in the connectors 128 of the aerodynamic pseudocontainer 140 of the lead container car 106. Specifically, in an embodiment, a locking device 126 is inserted into each top connection opening 125a located along a top face (e.g., along the top wall 116) of the top corner fittings 125. The locking device 126 may be interbox connectors (IBCs) or twist lock devices that are used to attach intermodal containers to each other, as noted above. For example, the locking device 126 may comprise a rotatable base 180 and at least one rotatable locking head 182 for releasable securement. Generally, the rotatable base 180 comprises a rotatable shaft that is rotatable or pivotable in at least two directions about a substantially vertical axis. For simplicity purposes only, the base 180 is depicted as merely comprising a rotatable shaft. However, it should be noted that the base 180 may comprise any number of shapes, designs, parts, or other devices corresponding to twist locks that may pivot or rotate as is known in the art, and should not be limited to the illustrated design. The rotatable base 180 or shaft is designed to be pivoted or rotated about the vertical axis to rotate one or more locking heads 182 between an unlocked position (as shown in FIG. 3a) and a locked position (as shown in FIG. 3b). In some instances, the rotatable base 180 may comprise a toggle pin which is designed to rotate 90 degrees. More specifically, the base or toggle pin may rotated between an unlocked position (e.g., at zero degrees) and a locked position (e.g., at 90 degrees), or vice versa.

In the illustrated embodiment, one locking head 182 is shown. However, it is to be understood that a second locking head may be provided (e.g., to be rotated and locked in the opening 125a of the corner fitting 125 of the bottom container), or, alternatively, that a lockable base for insertion into the corner fittings 125 may be provided. Such methods of securing locking devices to corner fittings are known in the art. The locking devices 126 may be attached to the corner fittings 125 of the container 114a. The locking devices 126 may be locked in the fittings 125 before or after alignment of the device 140 with the bottom container 114a, and should not be limiting.

As shown in FIGS. 3a and 3b, the locking device 126 is locked within corner fitting 125, with at least a locking head 182 extending into the connection opening 128 of the pseudocontainer 140. The locking head 182 may comprise a substantially tapered, oblong shape. Locking heads 182 may be provided on either or both sides of the base 180. The locking head 182 is designed such that it may be easily inserted into the connection openings 125a of the corner fittings 125 of the container 114a, and/or inserted into the lock-receiving openings 158 of the connectors of the pseudocontainer 140. In some embodiments, the head 182 may be of substantially similar shape to that of the connection openings 125a and/or openings 128. Although the tapered, oblong shape of the locking head 182 assists in inserting and locking the locking device 126 in the corner fittings 125 and/or connectors 128, the shape of the locking head 182 should not be limited. For example, the locking head 182 may comprise a pin. Also, the base of the locking head 182 may comprise a shape that, when the locking head 182 is rotated or twisted, the base prevents the head 182 from being removed or withdrawn from openings 125a and/or openings 158.

The rotation of the locking device 126 may be manually or automatically actuated. For example, as noted, devices such as IBCs or twist locks may be used. Such devices generally comprise a handle or toggle arm for inducing rotation to one or more of the locking heads provided on the locking device 126. As such, a handle or toggle arm (not shown in the Figures) may be used to rotate one or more heads 182 of the locking devices 126 to connect/clamp within the corner fittings 125 and openings 128.

In an embodiment, any type of releasable clamping or locking device may be provided for releasably securing the aerodynamic pseudocontainer 140 to the corner fittings 125 of bottom container 114a. The releasable clamping devices may be activated in any number of ways and should not be limiting.

A lift device is used to align the aerodynamic pseudocontainer 140 on top of the bottom container 114a. The lift device may be a device that is known and/or exists in the rail or train yard, such as a spreader. For example, the lift device may comprise a spreader beam structure which is attached to and suspended by a crane (not shown). As is known in the art, the spreader beam structure may comprise a plurality of shapes. The lift device may be used to raise or lower containers as needed (e.g., such as when containers 112, 114 need to be stacked). A rotatable or twist lock device may be provided in each corner of the spreader beam structure, and the containers may be mounted or stacked in a similar manner as disclosed in U.S. patent application Ser. No. 12/259,029, to Iden et al, filed Oct. 27, 2008. Utilizing the lift device and spreader beam structure for attachment of the aerodynamic pseudocontainer 140 to a bottom container 114 is beneficial as the lift device and structure are existing devices and no modifications need to be made to lift and mount the pseudocontainer 140. Also, using such a lift device for lifting is particularly useful due to weight of the aerodynamic pseudocontainer 140. Using such equipment also reduces the amount of effort and manpower required to attach the pseudocontainer 140. For example, in some embodiments, when attaching the aerodynamic pseudocontainer 140, only a crane operator and ground operator are required.

To attach the aerodynamic pseudocontainer 140 to the top of container 114a, the lift device 154, with the pseudocontainer 140 attached thereto, is lowered by a crane operator toward the container 114a. The twist lock devices 126 extending from the bottom container 114a are aligned with the openings 158 of the connection devices 158 in the bottom portion of the aerodynamic pseudocontainer body 140. After the twist lock devices 126 are aligned, the lift device may then be lowered such that the locking heads 182 of each twist lock device 126 are inserted into the openings 158 of the connectors 128. The twist lock devices 126 are then rotated and locked, as illustrated in FIG. 3b. Specifically, the rotatable base 180 rotates about an axis A in a first direction so as to turn the locking head 182 from an unlocked position as shown in FIG. 3a to a locked position as shown in FIG. 3b (i.e., out of alignment with the openings 158). The container 114a then has the aerodynamic pseudocontainer 140 securely attached to its corner fittings 125.

FIGS. 7-10D illustrate views of a bottom intermodal container 114a having an aerodynamic pseudocontainer 160 of alternate shape attached thereto in accordance with an embodiment of the present invention. In a similar manner to pseudocontainer 140, aerodynamic pseudocontainer 160 comprises a body having an aerodynamic configuration and attachments or connectors 128. In the embodiment of FIG. 7, the pseudocontainer 160 is mounted on and attached to the top wall 116 of the leading bottom intermodal container 114a of the lead container car 106, such that, as the train 100 moves in a forward direction 134, air coming up and over the locomotive 102 may be directed over at least a top portion 162 of the pseudocontainer 160, as represented by arrow 135, thus reducing the resistance or drag.

Similarly, the aerodynamic pseudocontainer 160 comprises a top portion 162, a bottom portion 164, side portions 166, a front portion 168, and back portion 170 which are connected together to form the body, for example. In some cases, two or more of the portions 162-170 may be connected by a frame or reinforcement device (not shown). Also, though only a first (e.g., left) side portion 166 is shown in detail in the Figures, it is to be understood that the second (e.g., right) side portion 166 comprises similar features as described herein.

Figure 9:
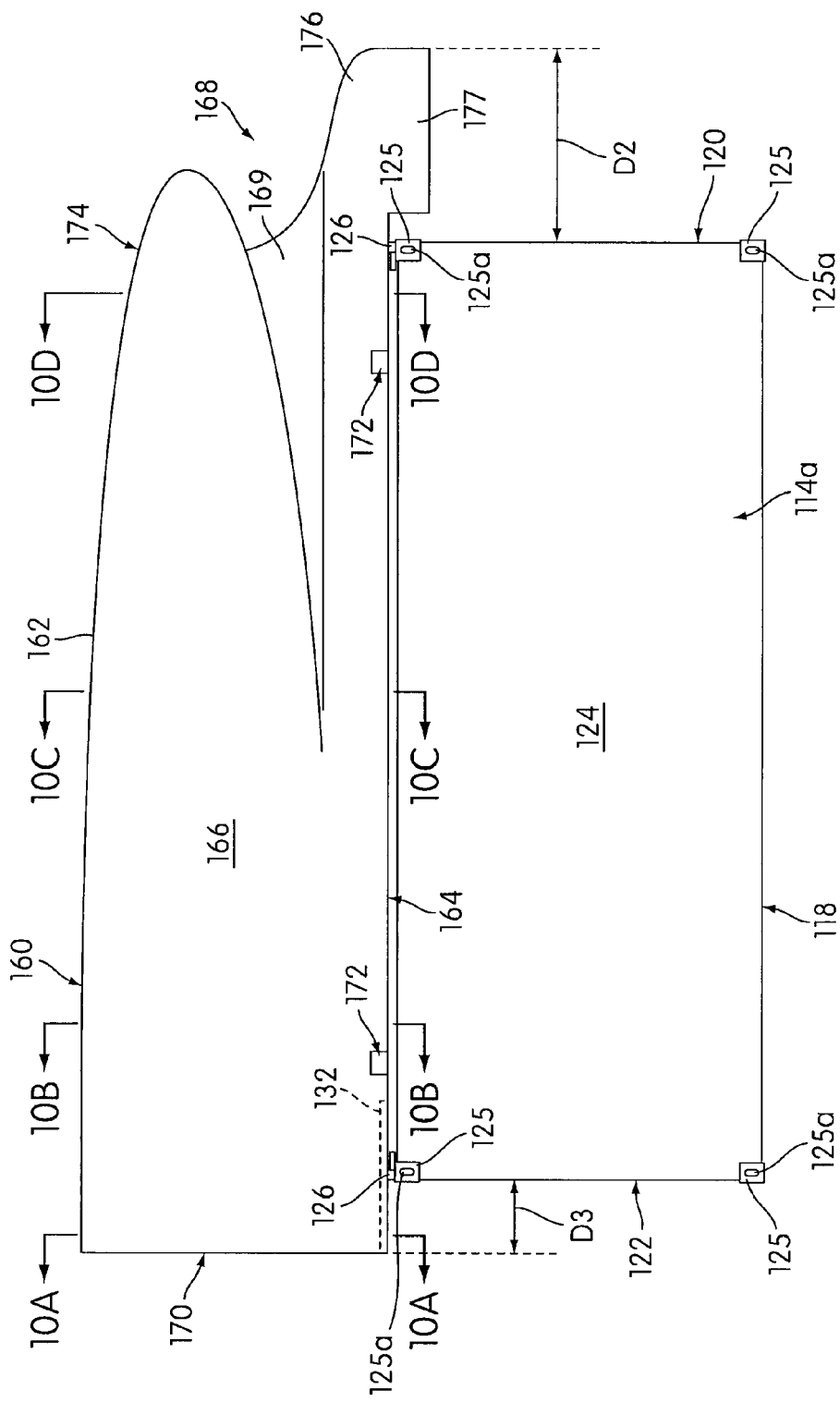
FIG. 9 illustrates a side view of the container and aerodynamic pseudocontainer of FIG. 7 in accordance with an embodiment of the present invention.
Figure 10A:
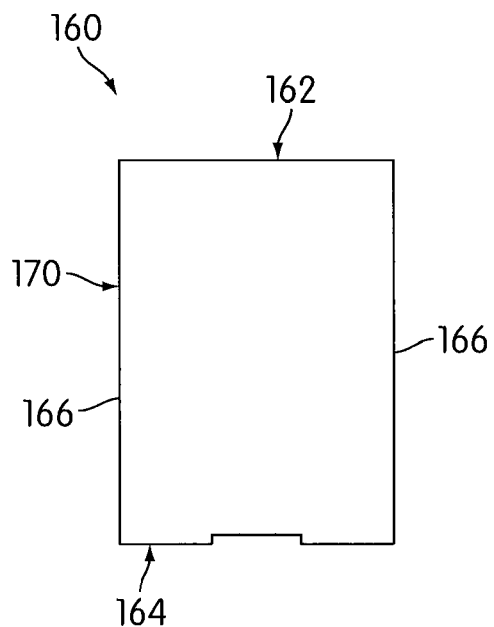
FIGS. 10A-10D illustrate cut-out views along the aerodynamic pseudocontainer of FIG. 7 in accordance with an embodiment of the present invention.
Figure 10B:
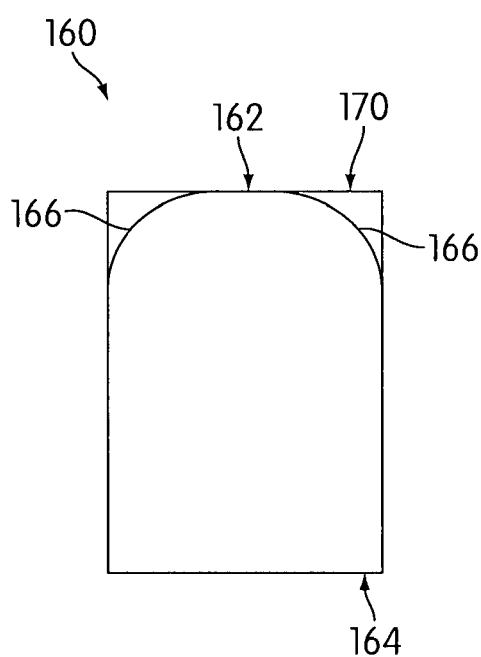
Figure 10C:
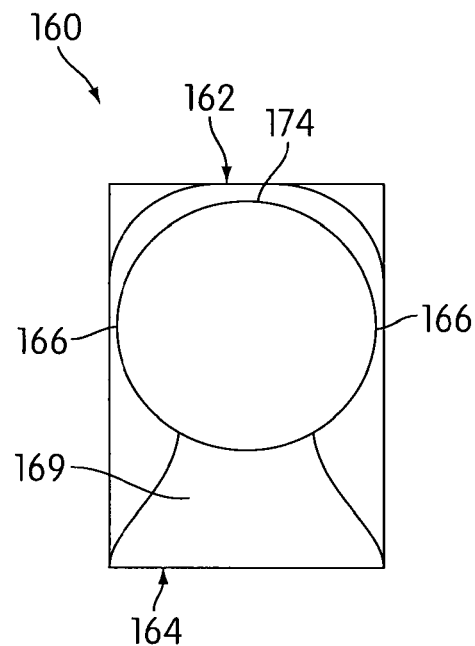
Figure 10D:
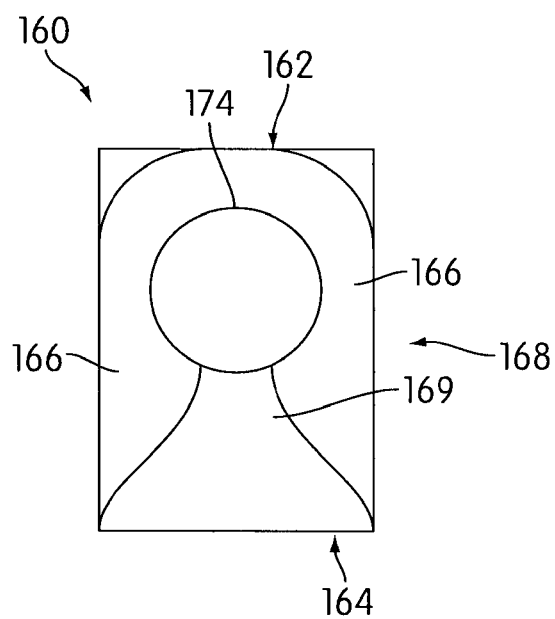

The back portion 170 is a substantially vertical portion that may be of a generally similar size (e.g., height and width) and shape to that of an intermodal container. Back portion 170 may comprise a substantially rectangular shape (e.g., rectangle or square). The front portion 168 of this embodiment comprises a substantially radiussed or rounded, "bullet-shaped" nose 174 and a substantially rounded front edge 176 formed from the top portion 162 and side portions 166. The front portion 168, nose edge 174, and front edge 176 comprise substantially rounded surfaces and limited corner so as to provide an aerodynamic shape. More specifically, the top portion 162 narrows or tapers longitudinally towards the front portion 168 from the back portion 170, such as shown in FIG. 9. Similarly, the side portions 166 comprise at least an edge that curves and narrows or tapers with the surface of the top portion 162 (toward the substantially rounded front edge 176), as illustrated by the cross-sections of the pseudocontainer 160 shown in FIGS. 10A-10D. Thus, a bullet-shaped nose 174 is formed.

The nose 174 is provided in spaced relation above the front edge 176. A substantially vertical beam member 169 may be provided therebetween. For example, beam member 169 may curve upwardly from an upper surface of the front edge 176 toward a lower surface of the nose 174. The substantially vertical beam member 169 may comprise rounded surfaces and/or edges. The beam member 169 may comprise surfaces that curve inwardly toward the nose 174, as well as outwardly into side portions 166.

The front edge 176 of the front portion 168 may also comprise a downward extension portion 177. As shown in FIG. 9, the front portion 168 may extend a distance D2 forwardly from a front wall 120 of the container 114a when stacked thereon (further noted below). The downward extension portion 177 comprises an edge curving downwardly at least partially adjacent to and/or in front of the wall 120 of the container 114. The curved surface of the downward extension portion 177 may further assist in directing air away from the wall 120 and around the container 114a, thereby further reducing drag.

The bottom portion 164 of the pseudocontainer 160 is configured to be stacked atop the container 114a. The bottom portion 164 may comprise a substantially rectangular configuration. The bottom portion 164 may comprise, at least in part, some dimensions that are substantially similar to the dimensions of the container 114a. The base or footprint of the bottom portion 164 may be such that it may be aligned with a standard ISO container that is 40 feet in length, for example. As noted above and as will become further evident, such dimensions or footprint is advantageous, as the dimensions for a 40 foot ISO intermodal container are substantially identical to those of any 45, 48, or 53 foot container with respect to the corner fitting locations.

The materials and manufacturing processes used to form the aerodynamic pseudocontainer 160 should not be limited. For example, the pseudocontainer may be formed for materials such as fiberglass, plastic film, and/or molded plastic or foam. The pseudocontainer may also be formed from multiple materials. In some embodiments, the portions of the pseudocontainer may be formed or manufactured separately and then connected together using suitable securement means or devices. In some cases, each of the portions 162-170 and 174-176 need not be made from the same materials. It should also be noted that it is within the scope of the invention to use a frame or reinforcement devices or securement devices for assembly of the pseudocontainer 160, and thus its assembly should not be limiting.

Figure 8B:
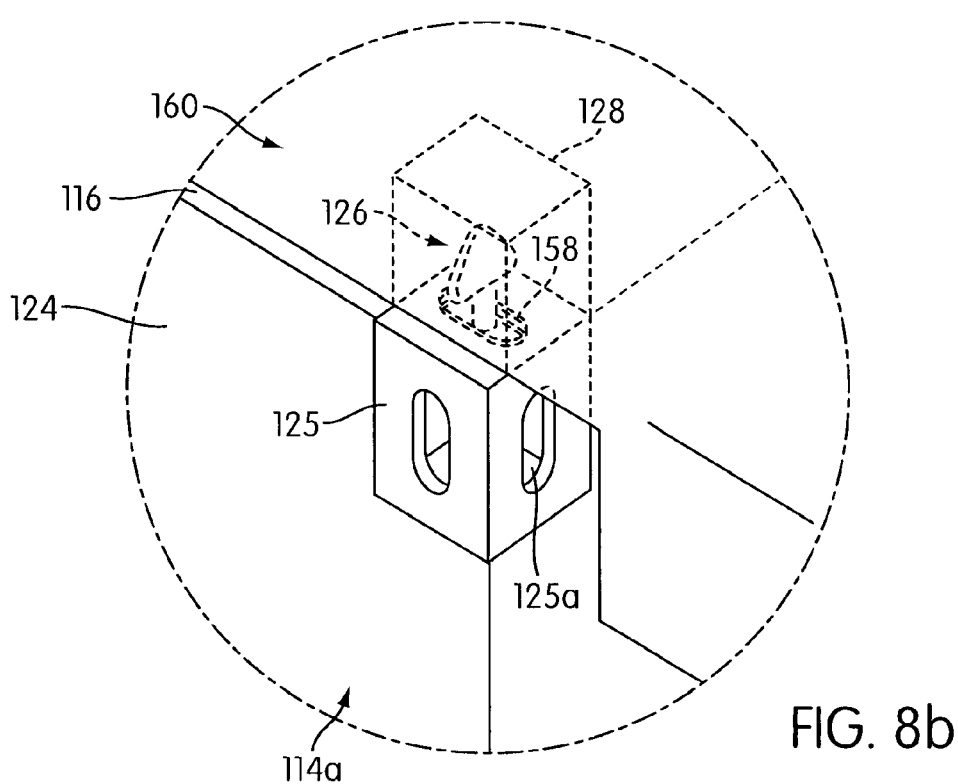

Additionally, in an embodiment, the aerodynamic pseudocontainer 160 is designed to utilize the existing corner fittings 125 of the bottom container 114a for mounting thereon. Thus, FIGS. 8a and 8b illustrate aerodynamic pseudocontainer 160 comprising similar connectors 128 as described with respect to FIGS. 3a and 3b. Also, aerodynamic pseudocontainer 160 may utilize locking devices 126 for mounting and securing to the bottom container 114a. That is the locking devices 126 may be inserted and locked into a corner fitting 125 of the container 114a and correspondingly inserted and locked in the connectors 128 of the aerodynamic pseudocontainer 160. Such description is provided above with respect to FIGS. 2-5, and illustrated in FIGS. 7-9, and is therefore not repeated at this point.

In order to move the aerodynamic pseudocontainer 160 through a train yard and/or mount the pseudocontainer 160 on top of a container 114a, a plurality of lift points 172 may also be provided in the body. For example, lift points 172 may be provided on the side portions 166 of the body. The lift points 172 may also be provided near or in a top portion 162 or near or in a bottom portion 164 of the pseudocontainer 160. In an embodiment, the lift points 172 comprise an opening extending into the body of the pseudocontainer 160. The openings of the lift points 172 may comprise any configuration, including a design similar to connection openings 125a of corner fittings 125 of an intermodal container, for example. The openings enable the aerodynamic pseudocontainer 160 to be lifted into position by the same existing lift equipment that may be used for lifting intermodal containers 112 or 114, such as a spreader (described above with respect to FIGS. 2-5). However, the location and design of the lift points 172 should not be limited.

Also, it should be noted that when transporting the pseudocontainer 160 around the yard, for example, it may be mounted or assembled for transportation via a gooseneck tunnel 132 provided in the bottom portion 144 of the pseudocontainer 160 (in any location) using known equipment (e.g., chassis trailer), such as described above with respect to pseudocontainer 140.

Figure 11:
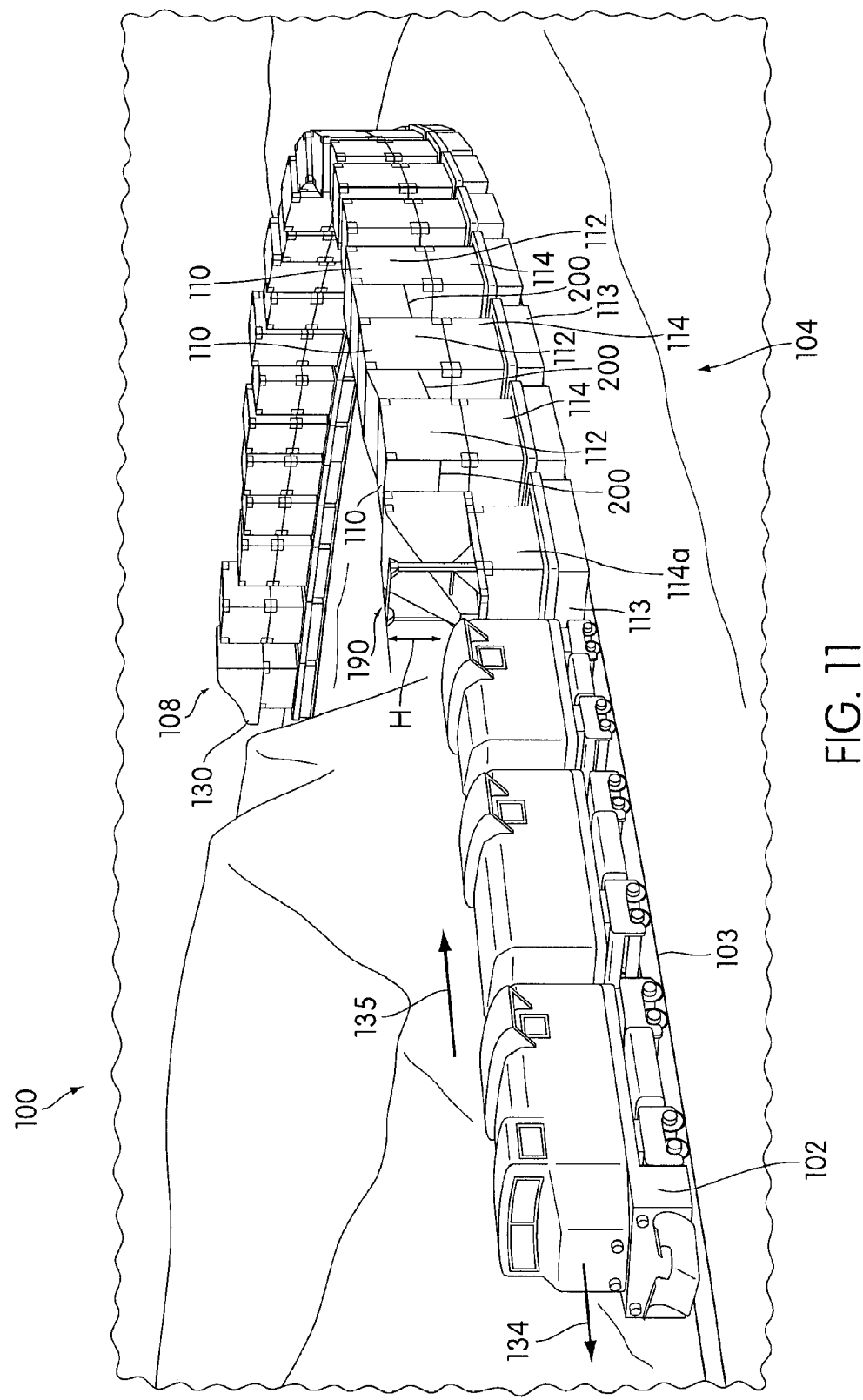
FIG. 11 illustrates a train comprising a locomotive pulling a series of stacked intermodal containers including an aerodynamic pseudocontainer in accordance with another embodiment of the present invention.
Figure 12:
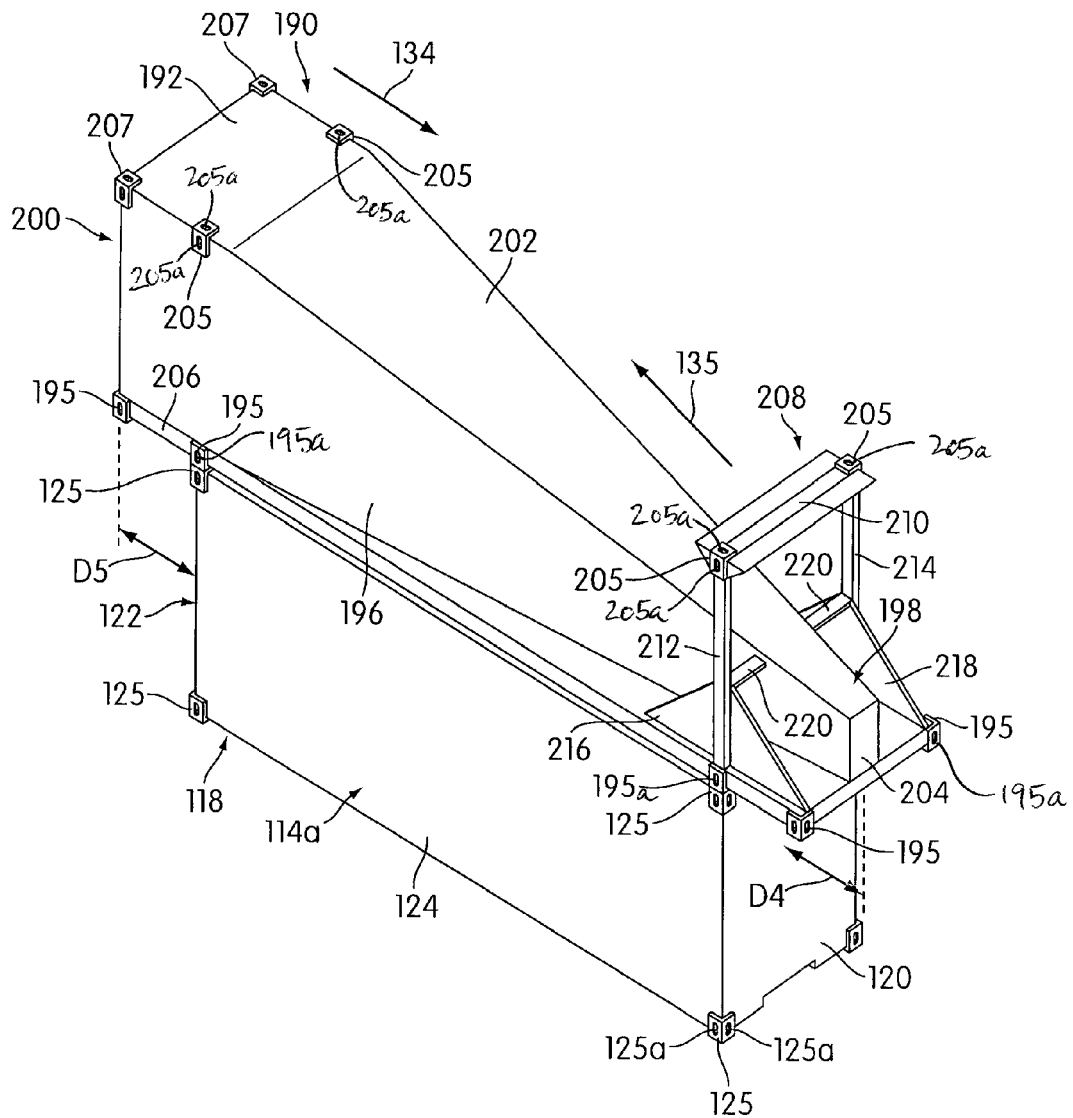
FIG. 12 illustrates a perspective view of the container and aerodynamic pseudocontainer of FIG. 11 in accordance with an embodiment of the present invention.
Figure 13:
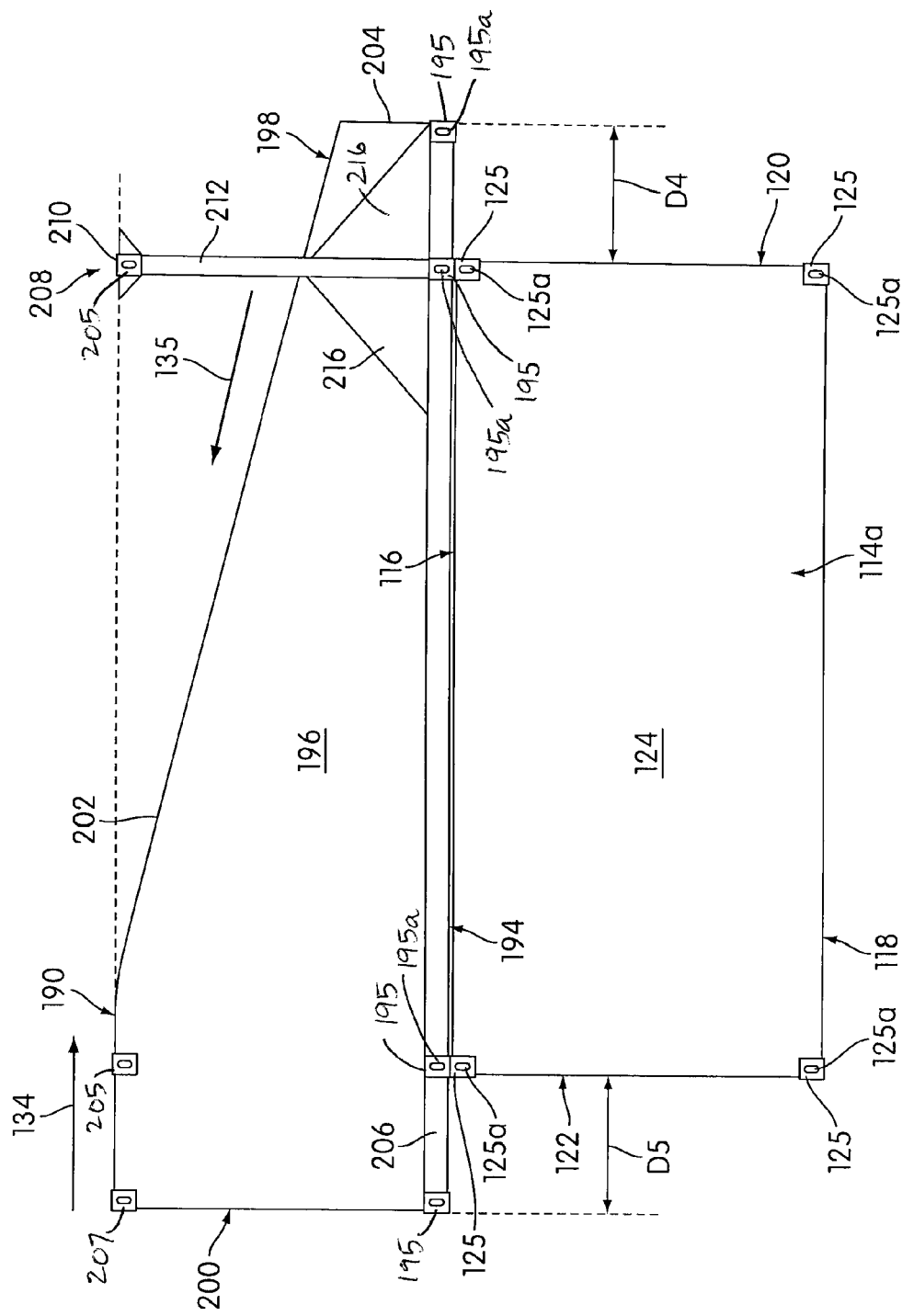
FIG. 13 illustrates a side view of the container and aerodynamic pseudocontainer of FIG. 12 in accordance with an embodiment of the present invention.
Figure 13A:
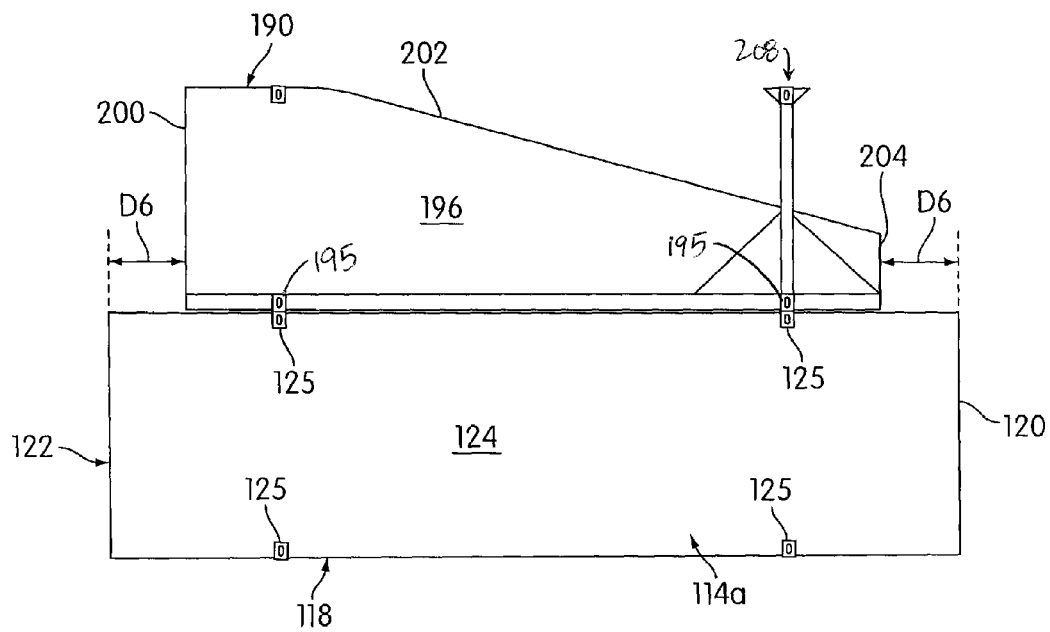
FIG. 13a illustrates a side view of the aerodynamic pseudocontainer of FIG. 12 on a 53-foot container in accordance with an embodiment of the present invention.
Figure 13B:
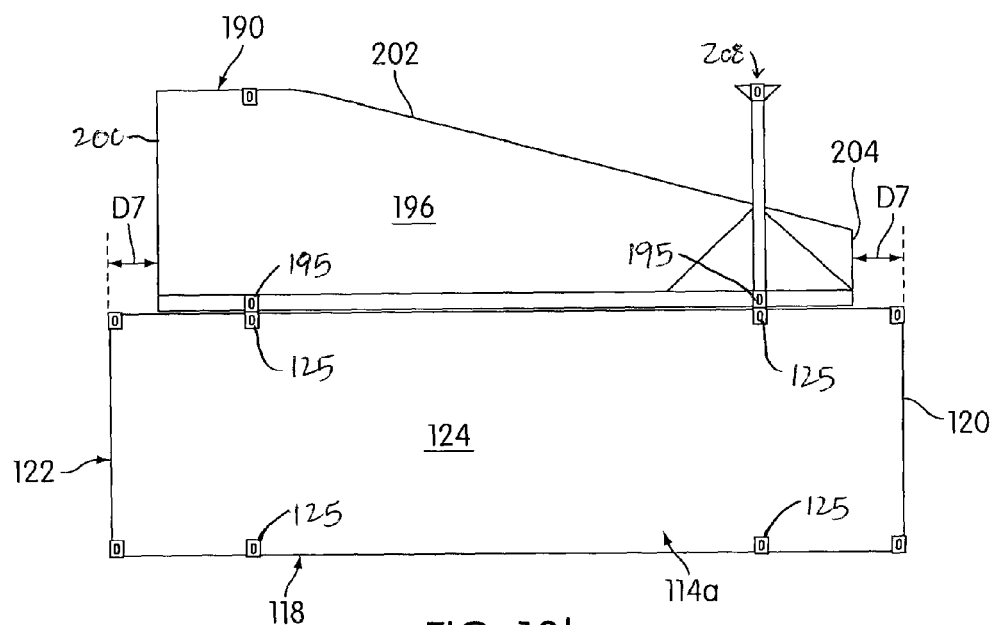
FIG. 13b illustrates a side view of the aerodynamic pseudocontainer of FIG. 12 on a 48-foot container in accordance with an embodiment of the present invention.
Figure 14:
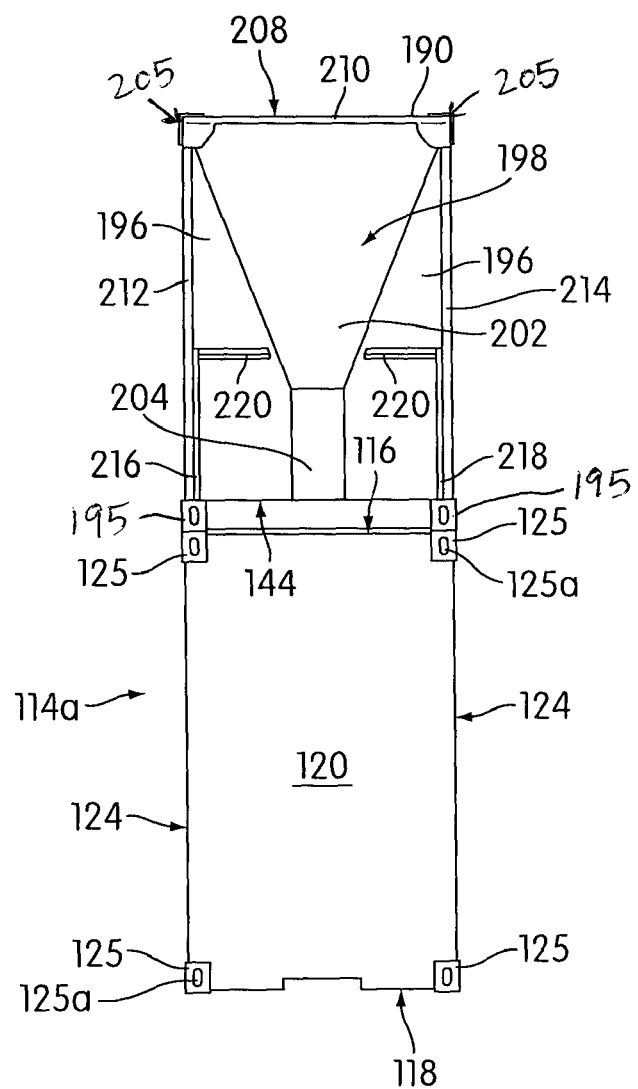
FIG. 14 illustrates a front view of the container and aerodynamic pseudocontainer of FIG. 12 in accordance with an embodiment of the present invention.

FIGS. 12, 13, and 14 illustrate views of a bottom intermodal container 114a having an aerodynamic pseudocontainer 190 attached thereto in accordance with another embodiment of the present invention. In a similar manner to the previously described pseudocontainers, aerodynamic pseudocontainer 190 comprises a body having an aerodynamic configuration configured to be stacked atop an intermodal container. In the embodiment of FIG. 12, the pseudocontainer 190 is mounted on and attached to the top wall 116 of an intermodal container 114a (e.g., which may be of the lead container car 106, as shown in FIG. 11), such that, as the train 100 moves in a forward direction 134, air coming up and over the locomotive 102 may be directed over at least a top portion 192 of the pseudocontainer 190, as represented by arrow 135, thus reducing the resistance or drag.

The aerodynamic pseudocontainer 190 comprises a top portion 192, a bottom portion 194, side portions 196, a front portion 198, and back portion 200 which are connected together to form the body, for example. In some cases, two or more of the portions 192-200 may be connected by a frame or reinforcement device (not shown). Also, though only a first (e.g., left) side portion 196 is generally shown in detail in the Figures, it is to be understood that the second (e.g., right) side portion 196 comprises similar features as described herein.

The back portion 200 is a substantially vertical portion that may be of a generally similar size (e.g., height and width) and shape to that of an intermodal container. Back portion 200 may comprise a substantially rectangular shape (e.g., rectangle or square). In the illustrated embodiment, back portion 200 has corner fittings 195 and 207 at each of its end corners, similar to standard configurations. However, corner fittings 195 and 207 need not be provided. The front portion 198 of this illustrated embodiment comprises an aerodynamic configuration which comprises a substantially tapered nose formed from a sloped portion 202 and a front end wall 204. Sloped portion 202 slopes generally downward in height from a height of top portion 192 to form a tapered or narrower front portion 198. More specifically, the sloped portion 202 narrows or tapers longitudinally towards the front portion 198 from the back portion 200, such as shown in FIG. 12. The nose of front portion 198 is provided in spaced relation from side edges of the bottom portion 194 (further described below). Although the front portion 198, the sloped portion 202 and tapered nose, and end wall 204 are shown as generally polygonal shapes, it should be understood that in an embodiment pseudocontainer 190 may comprise substantially rounded surfaces and limited corners so as to provide an aerodynamic shape. Similarly, the side portions 196 may comprise at least an edge that curves and narrows or tapers with the sloped surface of the sloped portion 202 (toward the front end wall 204).

The bottom portion 194 of the pseudocontainer 190 is configured to be stacked atop the container 114a. The bottom portion 194 may comprise a substantially rectangular configuration. The bottom portion 194 may comprise, at least in part, some dimensions that are substantially similar to the dimensions of the container 114a. The base or footprint of the bottom portion 194 may be such that it may be aligned with a standard ISO container that is 40 feet in length, for example. Again, such dimensions or footprint is advantageous, as the dimensions for a 40 foot ISO intermodal container are substantially identical to those of any 45, 48, or 53 foot container with respect to the corner fitting locations.

Bottom portion 194 of pseudocontainer in this illustrated embodiment is configured to have a plurality of bottom fittings 195 having lock-receiving openings 195a, instead of, or in addition to, the above-described connectors 128 (not shown in FIGS. 12-14). In an embodiment, the aerodynamic pseudocontainer 190 is designed to utilize the existing corner fittings 125 of the bottom container 114a for mounting thereon. For example, the plurality of bottom fittings 195 may be positioned such that they align with corner fittings 125 of intermodal container 114a when the pseudocontainer 190 is stacked thereon. In an embodiment, the bottom fittings 195 may be formed in accordance with ISO standards, e.g., ISO 1161 1984, and are substantially similar to corner fittings 125 of the intermodal container 114a. That is, the lock-receiving openings 195a of the bottom fittings 195 may be designed or formed such that a plurality of types of locking devices may be used and/or secured therein.

In an embodiment, the bottom portion 194 may comprise a bottom wall or frame 206 for supporting fittings 195 in both the front and back of the pseudocontainer. For example, the wall 206 may comprise a substantially rectangular shape for positioning fittings 195 for alignment with corner fittings 125 of the container 114a. Additionally, wall 206 may provide additional structural support to the bottom portion 194, as well as the front portion 198.

In an embodiment, bottom portion 194 as shown in FIGS. 12, 13, and 14 is configured to be a recycled portion of a previously formed container. For example, the wall 206 of bottom portion 194 may comprise a bottom wall or floor of a 45 foot ISO container. This would provide a bottom wall 206 with corner fittings already positioned thereon in accordance with ISO standards. Thus, bottom fittings 195 may be existing corner fittings of an intermodal container. Other size containers or floors of alternate dimensions, widths, etc., however, may also be used.

Alternatively, in an embodiment, it is envisioned that pseudocontainer 190 may utilize attachments or connectors as shown in the prior illustrated embodiments. For example, in instead of, or in addition to, fittings 195, connectors similar to connectors 128 may be provided on pseudocontainer.

Also, aerodynamic pseudocontainer 190 may utilize locking devices for mounting and securing to the bottom container 114a. For example, locking devices 126 may be inserted and locked into corner fittings 125 of container 114a and correspondingly inserted and locked in bottom fittings 195 of the aerodynamic pseudocontainer 190 to connect the two together. Other locking devices may also be used. Such description is provided above with respect to FIGS. 2-5, and illustrated in FIGS. 7-9, and is therefore not repeated at this point.

In this particular embodiment, in order to move the aerodynamic pseudocontainer 190 through a train yard and/or mount the pseudocontainer 190 on top of container 114a, a plurality of fittings 205 are associated with at least top portion 192 of the body. As shown in FIG. 12, the top portion 192 is formed from a horizontal surface that is connected to back portion 200 and at least a part of each side portion 196. The fittings 205 may be positioned in a similar manner as two back fittings of a standard intermodal container, for example. Each fitting 205 comprises receiving openings 205a which are configured to receive parts of a positioning device (e.g., crane) when stacking and aligning the body atop an intermodal container. The fittings 205 and their openings 205a enable the aerodynamic pseudocontainer 190 to be lifted into position by the same existing lift equipment that may be used for lifting intermodal containers, such as a spreader or crane (described above with respect to FIGS. 2-5). For example, openings 205a may be provided on a top and a side of the fitting 205. The fittings 205 are formed and positioned in a similar manner as standard corner fittings an intermodal container, for example. Top portion 192 may also comprise, in an embodiment, fittings 207 in its end corners. Fittings 207 also have receiving openings therein, and, may also be configured to receive parts of a positioning device for transport.

To position fittings 205 near or at front portion 198 so that pseudocontainer can be transported in a yard a similar manner as an intermodal container, pseudocontainer 190 comprises a support frame 208 at its front portion 198, as shown in FIG. 12, for example. Support frame 208 is positioned to support at least two fittings 205 comprising receiving openings 205a at a substantially similar height as the plurality of fittings associated with the top portion 192 of the body 190. In particular, in an embodiment, the fittings 205 are designed to be positioned in a similar location as two top fittings on a standard ISO container, for example.

In accordance with an embodiment, such as illustrated in the FIGS., support frame 208 comprises a pair of vertical frame members 212 and 214 and a transverse cross piece 210. Each vertical frame member 212 and 214 is spaced laterally from the front portion 198 (i.e., from the tapered end) and on an opposite side of the front portion 198. A first end of each vertical frame member 212, 214 is attached to bottom portion 194 and a second end of each vertical frame member 212, 214 is attached to the transverse cross piece 210.

In an embodiment, the transverse cross piece 210 is positioned at a substantially similar (or the same) height as top portion 192. At each of its ends (or corners) transverse cross piece 210 comprises a pair of fittings 205 or corner castings, each having its own receiving openings 205a, as described above. In another embodiment, each fitting 205 is provided at a juncture of the transverse cross piece with one of the vertical frame members 212, 214. Generally, the vertical frame members 212 and 214 and transverse cross piece 210 are formed and positioned to support fittings 205 at their vertical location (e.g., spaced laterally from and vertically above the tapered front portion 198).

The fittings 205 in both the top portion 192 and on support frame 208 allow pseudocontainer 190 to be lifted, for example, between a chassis trailer and a well car, by a positioning device (e.g., crane) without any special work by an operator or ground worker(s) when positioning and locking the containers 190 and 114a together.

In addition to providing fittings 205 for moving and lifting the body, lift pocket areas may also be used to facilitate moving and lifting with other positioning devices (such as a trailer with extended swing arms). For example, as shown in FIG. 12, lift pocket areas are provided on opposite sides of the front portion 198. In the illustrated embodiment, each lift pocket area comprises a horizontal member 220 having ends connected to a vertical frame member 212 or 214 and front portion 198. Parts of positioning device(s) may be inserted into the lift pocket areas (e.g., horizontally from the front) and at least contact the horizontal members 220 when moving the pseudocontainer 190.

Alternatively, horizontal members 220 and the like may also be provided to add strength and stability to support frame 208.

Also shown in FIGS. 12-13b are supports 216 and 218. Supports 216 and 218 (which in the FIGS. are shown in a non-limiting triangular or "V"-shape) are positioned and secured to bottom portion 194 and vertical frame members 212 and 214. Supports 216 and 218 may form part of the lift pocket areas. Additionally or alternatively, supports 216 and 218 may be added to provide additional support, stability and strength to support frame 208, for example. Also, in an embodiment, horizontal members 220 may be connected to one or more supports 216, 218 (if provided) on either side of the pseudocontainer 190.

In an embodiment, the vertical frame members 212, supports 216 and 218, and horizontal members 220 may form lift pocket areas adjacent either side of the front portion 198.

It should be noted that in addition to the plurality of fittings 205 associated with the top portion 192 of the body and the bottom fittings 195, the aerodynamic pseudocontainer 190 may further comprise a plurality of lift points, similar to lift points 172, for example, in or on the body. For example, lift points may be provided on the side portions 196 of the body. However, a location and design of additional lift points should not be limited. Also, it should be noted that when transporting the pseudocontainer 190 around the yard, for example, a gooseneck tunnel (e.g., in a bottom portion of the pseudocontainer) may also be utilized for transport and positioning using known equipment (e.g., chassis trailer), such as described above with respect to pseudocontainer 140.

Aerodynamic pseudocontainer 190 should not be limited by the illustrated shape and that other aerodynamic shapes may be used to form at least the front portion 198 of the body. For example, in an embodiment, pseudocontainer 190 may comprise a bullet-shaped nose such as shown on front portion 168 in FIG. 7. In another embodiment, pseudocontainer 190 comprises substantially radiussed or rounded nose edge as shown on front portion 148 in FIG. 2, and/or underhang portion as shown in FIG. 6, for example.

The materials and manufacturing processes used to form the aerodynamic pseudocontainer 190 should not be limited. For example, the pseudocontainer may be formed for materials such as fiberglass, plastic film, and/or molded plastic or foam. Alternatively, metals, woods, or other materials may be used. The pseudocontainer may also be formed from multiple materials. Additionally, the materials may be recycled or reused materials. In some embodiments, the portions of the pseudocontainer may be formed or manufactured separately and then connected together using suitable securement means or devices (e.g., welding). For example, to fabricate parts of support frame 208, steel shapes may be used and formed inside a standard intermodal container. In some cases, each of the portions 192-200 need not be made from the same materials. It should also be noted that it is within the scope of the invention to use a frame or reinforcement devices or securement devices for assembly of the pseudocontainer 190, and thus its assembly should not be limiting.

The aerodynamic pseudocontainer, as described in any of the above exemplary embodiments and FIGS., provides several advantageous features. For example, an aerodynamic pseudocontainer such as pseudocontainer 140 securely attached to an intermodal container 114 in a lead container car 106 or a first set of containers adjacent a locomotive will significantly reduce aerodynamic drag at a front end of the train (or wherever the locomotive is positioned within the length of the train) when moving in a forward direction 134. Such a reduction in aerodynamic drag and vortices thus provides the potential to reducing fuel consumption. For example, a small reduction in fuel consumption for a large railroad company, such as one percent (1%), may equate to a very large reduction of the overall amount of fuel or gas used annually for a large rail operator. Therefore, the aerodynamic pseudocontainer also aids in improving the fuel efficiency of the train 100, as well as increase the travel range (distance).

Additionally, the aerodynamic pseudocontainer provides a reduction in the amount of exhaust emissions per unit transportation-work performed. Also, it should be noted that although pseudocontainer is a "false" device, i.e., is a non-revenue generating structure that does not carry goods, the pseudocontainer still provides cost reduction benefits when used because of its aerodynamic configuration to reduce air drag. In any event, it is estimated that the amount of fuel savings produced based on the reduction in air drag or resistance will generally outweigh the revenue lost by not carrying a revenue generating container as a top container in the lead container car 106 or as a top container in a series of containers.

Further, an additional potential benefit of the aerodynamic pseudocontainers 140, 160 and/or 190 is that the pseudocontainer may be used to incorporate additional equipment and technology thereon. For example, air-operated flaps or spoilers may be placed on an exterior of a rear-half portion of the aerodynamic pseudocontainers 140, 160, and/or 190. Such devices as the flaps or spoilers may be permanently attached or selectively activated. In some embodiments, the activation of such aerodynamic drag reducing devices may be a result of a control command caused by the use of a braking device (e.g., electronically-controlled pneumatic (ECP) braking train line cable). The activation of such devices could reduce the aerodynamic advantage the aerodynamic pseudocontainer, as the devices would increase resistance. These devices may be utilized during events such as during train braking maneuvers to reduce wear-and-tear on freight car brake shoes when slowing or stopping the movement of the train 100, for example. Thus, in some embodiments, the aerodynamic pseudocontainers 140, 160, and/or 190 may serve to both reduce aerodynamic drag and use increased aerodynamic drag to supplement train air braking.

The aerodynamic pseudocontainers 140, 160, and/or 190 are also advantageous as each is designed such that it may be easy to install by operators as the bottom container 114a, 114a to which it is mounted need not be adjusted or modified since it uses existing holes and openings (e.g., corner fittings 125) and equipment (e.g., lift device and spreader beam). The pseudocontainers 140, 160, and/or 190 also allow for simplified installation (or removal) without risk of harm or injury to the body, the pseudocontainer, or the operators. In an embodiment, the aerodynamic pseudocontainers 140, 160, and/or 190 may be a removable structure that may be attached to any number of containers in a set of stacked intermodal containers.

The use of the locking devices 126 also provides several advantages. As noted above, the locking devices 126 comprise structures (i.e., twist locks) that are generally known in the art. As such, additional devices need not be manufactured, and use of such devices need not be learned. Also, the pseudocontainers 140, 160, and/or 190 themselves may also be low in cost to produce or manufacture. Additionally and/or alternatively, such as described with reference to pseudocontainer 190 in FIGS. 12-14, recycled materials may be used to manufacture parts of the pseudocontainer. Thus, the device may be economical and/or cost effective.

In addition to the above noted advantages, the aerodynamic pseudocontainers 140, 160, and/or 190 described above are advantageous as they are designed to be placed atop an intermodal container 114 or 114a. It is estimated that the use of such a pseudocontainer 140, 160, and/or 190 may increase the reduction of resistance or drag by approximately fifty percent (50%) as compared to other fairings or devices that may be attached just to a face or edge of a container, for example. In some cases, it is estimated that pseudocontainers 140, 160, and/or 190 may provide approximately twelve percent (12%) reduction in the amount of drag on a train.

Moreover, the aerodynamic pseudocontainers 140, 160, and/or 190 may be attached to intermodal containers of various sizes (e.g., 40, 45, 48 or 53 feet in length), such as illustrated in FIGS. 13, 13a, and 13b. As noted, a bottom container 114 may be placed in a well of the car 113, and the pseudocontainer 140, 160, and/or 190 is seated and mounted/locked with respect to its top wall 116. However, the mounting of the aerodynamic pseudocontainer 140, 160, and/or 190 need not be adjusted and is not affected, as the pseudocontainers 140, 160, and/or 190 may be easily aligned to fit intermodal containers of differing dimensions. For example, as noted previously and shown in the FIGS., intermodal containers may comprise corner fittings 125 at or near a corner of its body. In some cases, such intermodal containers of greater length may comprise two sets of corner fittings, and/or a set of fittings at a position spaced inwardly from a corner formed at junction of three walls (i.e., a fitting may be positioned on a corner formed at a junction of two walls). Each set of corner fittings may be substantially equivalent to corner fittings 125 as described above, and are generally known in the art. Because the spacing between the connection openings 125a in each corner fitting 125 on the front wall 120 and back wall 122 are set via ISO standards (e.g., 7 feet, 4 and $^{31}/_{32}$ inches), and all of the ISO containers have corner fittings 125 at such locations, the mounting of the aerodynamic pseudocontainer (using the connectors 128) requires little adjustment. Thus, the aerodynamic pseudocontainers 140, 160, and/or 190 as provided herein may be attached to any size container having a plurality of corner fittings. For simplicity purposes only, however, some of the containers 114, 114a as shown in the Figures illustrate a single set of corner fittings 125 provided in each corner of the container. However, it is to be understood that the configurations of the corner fittings as shown in FIG. 13a or 13b may applied to any of the intermodal containers herein illustrated.

For example, referring to FIGS. 2-5, in an embodiment, the bottom container 114a may be a container comprising a length of 40 feet. As such, in an embodiment, the aerodynamic pseudocontainer 140 may comprise a length and connection openings 128 to be mounted on the container 114a. Once the aerodynamic pseudocontainer 140 and container 114a are connected together, a substantial amount of the body of pseudocontainer 140 overlies the bottom container 114a. However, a front portion 148 of the aerodynamic pseudocontainer 140 may overhang a distance D1 with respect to the bottom container 114a. Specifically, as shown in FIGS. 2 and 4, for example, the front portions extends distance D1 forwardly from the front wall 120 of the intermodal container 114a when stacked thereon. The overall length or clearance required for attaching the lead container car 106 to the locomotive 102 or another container car 113 (e.g., via couplings) thus increases by a distance D1.

In some embodiments, the front, substantially rounded nose edge 156 (or 156a) may overhang distance D1 forward of the front wall 120 of the bottom container 114a. In some cases, the distance D1 is determined based on a distance between the lead container car 106 and a back of the locomotive 102, for example; that is, the distance D1 should be less than that distance. In some embodiments, the distance D1 may be approximately 4 feet to approximately 6 feet. In an embodiment, the pseudocontainer 140 may increase the overall length needed for clearance of the lead container car 106 up to and including approximately 7 feet. The pseudocontainer 140 may be shaped such that it extends or overhangs with respect to the front wall 120 or the back wall 122 of the container 114, and the amount of overhang distance or its extension should not be limiting.

In some embodiments, when the connectors 128 of the aerodynamic pseudocontainer are aligned with the corner fittings 125 of the bottom container 114, the overhang distance may vary. Such an embodiment is shown with respect to aerodynamic pseudocontainer 160 in FIGS. 7-9, for example. The aerodynamic pseudocontainer 160 may comprise a length with connection openings 128 at a location associated with ISO specifications, but whose overhang distance varies with respect to the size of the intermodal container 114a it is mounted thereon.

For example, as shown, the pseudocontainer 160 may have a front portion 168 that extends a front overhang distance D2 forwardly from the front wall 120 of the container 114a, and a back portion 170 that extends a rear overhang distance D3 rearwardly from the back wall 122 of the container 114a. Similarly, front portion 198 of pseudocontainer 190 may extend a front overhang distance D4 from front walls 120 of container 114a, and back portion 200 may extend a rear overhang distance D5 rearwardly from the back wall 122 of container 114a. Because the container 114a may comprise any number of sizes or lengths, in an embodiment, the overhang distances D2 and D3 may be variable. In an embodiment, should the container 114a be a container that is 40 feet in length, the front overhang distance D2 may comprise a length of up to and including approximately 7 feet, and the rear overhang distance may comprise a length of approximately 0 feet. That is, the pseudocontainer may be designed such that the back portion is substantially flush with the back wall of the container (e.g., such as shown in FIG. 2). Alternatively, in some embodiments, the distances D2 and D3 may vary and be greater than zero. For example, should the container 114a be a standard ISO container of larger size, i.e., 45 feet, 48 feet, or 53 feet, the overhang distances D2 and D3 may vary. In some cases, the front overhang distance D2 may be configured such that the distance D2 is a fixed length, e.g., up to and including approximately 7 feet, while the rear overhang distance D3 varies in length and is dependent upon the length of the container 114a the pseudocontainer is mounted on. As such, the overall length needed for clearance as the lead container car 106 may also be adjusted.

As an example, as shown in the chart below, the front overhang distance D2 may be set to a fixed length, e.g., 7 feet, while the rear overhang distance D3 and/or the overhang length needed for proper clearance of the lead container car may vary according to the size of the chosen container:

| Intermodal Container Length (Container 114a) | Front Overhang Distance D2 of Pseudocontainer | Rear Overhang Distance D3 of Pseudocontainer | Overall Length Needed for Lead Container Car 106 |
| --- | --- | --- | --- |
| 40' | up to approx. 7'0" | 0'0" | up to approx. 47'0" |
| 45' | up to approx. 7'0" | up to approx. 5'0" | up to approx. 52'0" |
| 48' | up to approx. 7'0" | up to approx. 8'0" | up to approx. 55'0" |
| 53' | up to approx. 7'0" | up to approx. 13'0" | up to approx. 60'0" |

Alternatively, it is envisioned that the rear overhang distance D3 may be a fixed length, while the front overhang distance D2 of the pseudocontainer varies based on the length of the container 114a it is mounted on. Of course, such distances and clearances noted above with respect to the pseudocontainer and/or lead container car 106 should not be limiting, and may be adjusted.

In another embodiment, the overhang distances D2 and D3, and/or D4 and D5 may be equal to each other. For example, connectors 128 and/or fittings 195 and/or 205 may be positioned on its corresponding pseudocontainer 140, 160, and/or 190 such that when it is stacked and aligned atop an intermodal container, it is centered with respect to the corner fittings 125 of the intermodal container and the overhang distances are substantially equal to each other. For example, with reference to FIG. 13, the pseudocontainer 190 may have fittings 195 on its bottom portion 194 for alignment with fittings of a 40 foot ISO container. In an embodiment, the bottom portion 194 may be approximately forty five (45) feet long (e.g., such as when a bottom wall or floor of a 45 foot ISO container is recycled and reused to form the bottom portion 194). Thus, when pseudocontainer 190 is positioned on such a 40 foot container 114a such that the bottom fittings 195 and corner fittings 125 are aligned, the overhang distances D4 and D5 may be equal to each other, i.e., approximately two and a half feet (2.5 ft).

In yet another alternative embodiment, as illustrated in FIGS. 13a-13b, the corner fittings 125 with connection openings may be provided at a location associated with ISO specifications, but when a pseudocontainer 190 is positioned therein, there may be a reduced or indented distance that varies with respect to the size of the intermodal container 114a it is mounted thereon. For example, in an embodiment wherein the bottom portion 194 of pseudocontainer 190 is approximately 45 feet in length, when the pseudocontainer 190 (or pseudocontainer 140 or 160) is positioned on a 53 foot container (e.g., see FIG. 13a) or a 48 foot container (e.g., see FIG. 13b), there is a reduced distance D6 or D7 with respect to the front and back walls 120, 122 of the container 114a it is positioned therein. More specifically, in the embodiment of FIG. 13a, the container 114a is a container that is 53 feet in length, with corner fittings 125 provided at a position spaced inwardly from its end corners and in accordance with ISO standards for 40 feet containers. The front reduced distance and rear over distance are equal, as indicated by D6, because the bottom fittings 195 of the pseudocontainer are also positioned in accordance with ISO standards for 40 foot containers. In this instance, for example, D6 may be approximately 4 feet in both the front and the back (i.e., 53 minus 45, then divided by 2). Similarly, in the illustrated embodiment of FIG. 13b, the front and back reduced distances are also equal, as indicated by D7, when positioned on a 48 foot ISO container with corner fittings 125 positioned in accordance with ISO standards for 40 foot containers. In this instance, D7 may be approximately one and a half (1½) feet in the front and in the back (i.e., 48 minus 45, then divided by 2).

Also shown in FIG. 13a is that corner fittings need not be provided at an end corner or junction of three walls. That is, a container 114 or 114a may comprise corner fittings positioned for connecting with other containers of different and/or same lengths. Any number of sets of corner fittings may be provided. Additionally, it is noted that the connection openings used for connecting and/or locking the pseudocontainer to the container should not be limited to those on the top portion 116 of the container. Although connection openings of the corner fittings 125 may be located on the top wall 116, locking devices may also be provided (for any of the disclosed pseudocontainers 140, 160, and/or 190) that are positioned to lock or connect with respect to connection openings located on or adjacent side walls of an intermodal container.

Additionally, it should be noted that it is envisioned in other embodiments that the aerodynamic pseudocontainer 140, 160, and/or 190 may be attached to a back or second end of a train 100 as well. For example, in addition or alternatively to the intermodal wedge pseudocontainer 140 on the lead container car 106, FIG. 1 also illustrates a perspective view of a second or trailing aerodynamic pseudocontainer 130 attached to a top wall 116 of a bottom container 114 of a trailing container car 108, which may be used in accordance with an embodiment of the present invention, to reduce the aerodynamic drag provided by a rear section of the train 100. The trailing aerodynamic pseudocontainer 130 may comprise a body having an aerodynamic shape that is substantially similar to that of pseudocontainer 140, pseudocontainer 160, pseudocontainer 190, or some other aerodynamic shape for reducing drag. The trailing pseudocontainer 130 also reduces the vortices, suction or vacuum effects which may be produced by the air flow 135 when the train 100 or series 104 of stacked intermodal containers are moving in a forward direction 134. In an embodiment, the second or trailing aerodynamic pseudocontainer 130 may comprise a similar structure as the front-mounted aerodynamic drag reducing devices 140 or 160 or 190 as described above. For example, the pseudocontainer 130 may be designed to comprise a body and connectors 128 for receiving twist locks therein. The pseudocontainer 130 may comprise a plurality of fittings 195 with receiving openings. In an embodiment, the fittings 195 may be formed in accordance with ISO standards, such as ISO 1161 1984. The pseudocontainer 130 may be stacked atop an intermodal container 114. The connectors 128 or fittings 195 may be aligned with twist locks which are inserted from the corner fittings 125 of the bottom container 114 to mount the pseudocontainer 130 to a container 114. For example, the mounting of pseudocontainer 130 may be performed in a similar manner as described with respect to the aerodynamic pseudocontainer 140, and/or may use similar attachment structures (including the locking devices 126) for securement with the corner fittings 125. The pseudocontainer 130 and intermodal container 114 may be provided in the trailing container car 108 and positioned at a distal end of the train 100.

In addition, as shown in FIG. 11, for example, it is noted that several designs or types of aerodynamic pseudocontainers may be positioned in a train for reduced drag. Shown in FIG. 11 are pseudocontainer 130 in the second or last set of containers within a length of the train, and pseudocontainer 190 in the first set of containers, adjacent the locomotive 102. However, the illustrated embodiment is not meant to be limiting.

While the principles of the invention have been made clear in the illustrative embodiments set forth above, it will be apparent to those skilled in the art that various modifications may be made to the structure, arrangement, proportion, elements, materials, and components used in the practice of the invention.

For example, locking devices 126 may be retractable. Also, the directions and ranges of which the devices may twist, rotate, or pivot should not be limiting. In some embodiments, one or more devices may be provided on an intermodal container and/or aerodynamic pseudocontainer to prevent movement of the locking devices 126 from a locked position (or unlocked position). Such device(s) would be particularly advantageous during movement transport of the containers by the train 100, as some movements may accidentally or inadvertently rotate or unlock the locking devices 126. In some embodiments, handles or toggle arms for rotating the devices may be permanently attached to each locking device. In some cases, alternate locking devices 126 may be provided. For example, as previously noted, locking devices 126 which may connect the pseudocontainer and intermodal container using side portions or side openings of the fittings 125 or connectors 128 is envisioned. Additionally, it is envisioned that a combination of locking devices may be used to secure the pseudocontainer to the intermodal container. Also, although in an embodiment, locking devices 126 may be provided or associated with a bottom wall or portion of the pseudocontainer, it is to be understood that locking devices 126 may also be removable and portable, or even storable (e.g., positioned or locked out of an extending position when not being used).

It is also envisioned that, in some instances, the connectors 128 may be used to assist in moving, attaching, or mounting the pseudocontainer in the yard (much like fittings 195 and/or 205). The connectors 128 may be used along or in combination with lift points 152 or 172, for example.

Also, additional aerodynamic reducing devices, such as curtains 200 shown in FIGS. 1 and 11, may be used with train 100. Curtains 200 generally have a first end attached to back walls 122 of a set of containers and a second end attached to front walls 120 of a second set of containers. The curtains 200 may comprise any sort of design or shape and may be attached any number of ways to the containers. The curtains 200 may be used to further reduce aerodynamic drag that may occur adjacent or around the containers as the train 100 moves in a forward direction 134.

It should also be noted that it is within the scope of the invention that the aerodynamic pseudocontainers 130, 140, 160, 190 and/or curtains 200 described herein may be used individually or in combination with each other. Also, it is within the scope of the invention that the aerodynamic pseudocontainers 130, 140, 160, 190 may be used individually or in combination with other devices, such as aerodynamic drag reducing devices designed for application to containers or stacked containers, such as those as disclosed in U.S. Pat. No. 7,784,409, issued Aug. 31, 2010 and filed on May 9, 2008, or U.S. patent application Ser. No. 12/259,029 to Iden et al., filed on Oct. 27, 2008, and/or aerodynamic drag reducing devices designed for application to locomotives, such as those disclosed in U.S. patent application Ser. No. 12/490,966 to Iden, filed on Jun. 24, 2009, all of which are herein incorporated by reference in their entirety.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An aerodynamic pseudocontainer for reducing aerodynamic drag associated with a train, the pseudocontainer comprising:

a non-freight carrying body configured to be stacked atop an intermodal container comprising corner fittings with connection openings, the body comprising a bottom portion, a top portion, side portions, a front portion, and a back portion;

a plurality of fittings associated with the top portion of the body, the fittings comprising receiving openings;

the bottom portion configured to be aligned with a top of the intermodal container;

a plurality of locking devices for connecting the body to the intermodal container, the plurality of locking devices configured to be secured within the connection openings of the intermodal container, and wherein the body of the pseudocontainer comprises an aerodynamic configuration for reducing drag when the train is in motion, and wherein the receiving openings of the fittings associated with the top portion of the body are configured to receive parts of a positioning device for aligning and stacking the body atop the intermodal container, wherein the aerodynamic configuration comprises a shape that tapers toward the front portion of the pseudocontainer, and wherein the body further comprises a support frame at the front portion, the support frame being positioned to support at least two fittings comprising receiving openings at a substantially similar height as the plurality of fittings associated with the top portion of the body.

2. The aerodynamic pseudocontainer according to claim 1, wherein the bottom portion comprises a plurality of bottom fittings having lock-receiving openings, the plurality of bottom fittings being aligned with the corner fittings of the intermodal container when the pseudocontainer is stacked on the intermodal container, and wherein the plurality of locking devices are secured in the connection openings of the corner fittings and in the lock-receiving openings of the bottom fittings.

3. The aerodynamic pseudocontainer according to claim 2, wherein each locking device comprises a rotatable locking device for releasably securing the locking device in each connection opening and each lock-receiving opening through rotation of the rotatable locking device.

4. The aerodynamic pseudocontainer according to claim 1, wherein the plurality of locking devices are provided on the bottom portion of the body, and wherein the plurality of locking devices are substantially aligned with the corner fittings of the intermodal container.

5. The aerodynamic pseudocontainer according to claim 1, wherein the support frame comprises a pair of vertical frame members and a transverse cross piece, the vertical frame members being spaced laterally from the front portion of the body, each on an opposite side of the front portion, and a first end of each vertical frame member being connected to the bottom portion of the pseudocontainer and a second end of each vertical frame member being connected to the transverse cross piece.

6. The aerodynamic pseudocontainer according to claim 5, wherein the support frame further comprises lift pocket areas to facilitate moving and lifting the pseudocontainer with a positioning device, the lift pocket areas being provided on opposite sides of the front portion thereof, each lift pocket area comprising a horizontal member having ends connected to the vertical frame member and to the front portion.

7. The aerodynamic pseudocontainer according to claim 1, wherein the connection openings of the corner fittings of the intermodal container are pin receiving holes.

8. The aerodynamic pseudocontainer according to claim 1, wherein the aerodynamic pseudocontainer is positioned adjacent a locomotive in the train.

9. A method for reducing aerodynamic drag of a series of containers, the series having at least a first set of containers, the set of containers comprising a non-freight carrying aerodynamic pseudocontainer stacked above an intermodal container, the pseudocontainer comprising: a bottom portion having a plurality of bottom fittings having lock- receiving openings, a top portion having fittings comprising receiving openings, and a vertically extending support frame at a front portion with fittings comprising receiving openings; the intermodal container comprising corner fittings comprising a plurality of connection openings each configured to receive a part of a locking device, the body of the pseudocontainer comprising an aerodynamic configuration for reducing drag when the series is in motion, the method comprising:

locking parts of a positioning device within the fittings associated with the top portion and the vertically extending support frame;

providing the non-freight carrying aerodynamic pseudocontainer atop the intermodal container using the positioning device;

aligning the bottom fittings of the bottom portion of the pseudocontainer with the corner fittings of the intermodal container;

removably mounting the pseudocontainer to the intermodal container using locking devices, each locking device configured to be secured in the connection openings of the intermodal container and in the lock-receiving openings of the pseudocontainer, and unlocking the parts of the positioning device from within the fittings associated with the top portion and the vertically extending support frame, wherein the aerodynamic configuration comprises a shape that tapers toward the front portion of the pseudocontainer.

10. The method according to claim 9, wherein the connection openings are located on a top wall of the intermodal container.

11. The method according to claim 9, wherein the connection openings are located on side walls of the intermodal container.

12. The method according to claim 9, wherein one or more of the locking devices further comprises a rotatable locking device, and wherein the method further comprises releasably securing the pseudocontainer to the intermodal container by rotating each rotatable locking device within a corresponding connection opening and/or a corresponding lock-receiving opening.

13. The method according to claim 9, wherein the locking devices are provided on the bottom portion of the body, and wherein the method further comprises:

aligning the plurality of locking devices with the connection openings of the corner fittings of the intermodal container;

inserting the plurality of locking devices into the connection openings of the corner fittings, and securing the locking devices in the connection openings.

14. The method according to claim 9, wherein the connection openings of the corner fittings of the intermodal container are pin receiving holes.

15. The method according to claim 9, wherein the fittings associated with the top portion of the bottom and the vertically extending support frame are used for the alignment of the bottom fittings of the bottom portion of the pseudocontainer with the corner fittings of the intermodal container.

16. The method according to claim 9, wherein the series of containers are attached to a locomotive in a train.

17. The method according to claim 9, wherein the fittings of the vertically extending support frame are positioned at a substantially similar height as the fittings of the top portion of the body.

18. The method according to claim 17, wherein the vertically extending support frame comprises a pair of vertical frame members and a transverse cross piece, the vertical frame members being spaced laterally from the front portion of the body, each on an opposite side of the front portion and connected to the bottom portion of the pseudocontainer and to the transverse cross piece.

19. The method according to claim 18, wherein the vertically extending support frame further comprises lift pocket areas to facilitate moving and lifting the pseudocontainer with a positioning device, the lift pocket areas being provided on opposite sides of the front portion thereof, each lift pocket area comprising a horizontal member having ends connected to the vertical frame member and to the front portion, and wherein the method further comprising using the lift pocket areas for the alignment of the bottom fittings of the bottom portion of the pseudocontainer with the corner fittings of the intermodal container.

\* \* \* \* \*